(12) United States Patent
Kim et al.

(10) Patent No.: US 11,068,347 B2
(45) Date of Patent: Jul. 20, 2021

(54) MEMORY CONTROLLERS, MEMORY SYSTEMS INCLUDING THE SAME AND MEMORY MODULES

(71) Applicant: Samsung Electronics Co., Ltd., Suwon-si (KR)

(72) Inventors: Hyunjoong Kim, Yongin-si (KR); Taekwoon Kim, Seoul (KR); Younghoe Kim, Suwon-si (KR); Wonhyung Song, Osan-si (KR); Jangseok Choi, Seongnam-si (KR); Joonseok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/878,793

(22) Filed: May 20, 2020

(65) Prior Publication Data
US 2021/0133028 A1 May 6, 2021

(30) Foreign Application Priority Data
Oct. 31, 2019 (KR) .......................... 10-2019-0137223

(51) Int. Cl.
*G06F 11/00* (2006.01)
*G06F 11/10* (2006.01)
(52) U.S. Cl.
CPC ...... *G06F 11/1076* (2013.01); *G06F 11/1004* (2013.01)
(58) Field of Classification Search
CPC .......................... G06F 11/1076; G06F 11/1004
See application file for complete search history.

(56) References Cited

U.S. PATENT DOCUMENTS

| 4,794,597 | A | 12/1988 | Ooba et al. |
| 6,567,950 | B1 | 5/2003 | Bertin et al. |
| 9,087,614 | B2 | 7/2015 | Son et al. |
| 10,268,541 | B2 | 4/2019 | Niu et al. |

(Continued)

OTHER PUBLICATIONS

X. Jian and R. Kumar, "ECC Parity: A Technique for Efficient Memory Error Resilience for Multi-Channel Memory Systems," SC '14: Proceedings of the International Conference for High Performance Computing, Networking, Storage and Analysis, New Orleans, LA, USA, 2014, pp. 1035-1046, (Year: 2014).*

*Primary Examiner* — Daniel F. McMahon
(74) *Attorney, Agent, or Firm* — Muir Patent Law, PLLC

(57) ABSTRACT

A memory controller configured to control a memory module including a plurality of memory devices which constitute a first channel and a second channel includes an error correction code (ECC) engine, and a control circuit configured to control the ECC engine. The ECC engine is configured to generate a codeword including a plurality of symbols by adaptively constructing, based on device information including mapping information, each of the plurality of symbols from a predetermined number of data bits received via a plurality of input/output pads of each of the plurality of memory devices, and transmit the codeword to the memory module. The mapping information indicates whether each of the plurality of input/output pads is mapped to the same symbol among the plurality of symbols or different symbols among the plurality of symbols. Each of the plurality of symbols corresponds to a unit of error correction of the ECC engine.

20 Claims, 21 Drawing Sheets

(56) References Cited

U.S. PATENT DOCUMENTS

| | | | | |
|---|---|---|---|---|
| 2003/0188251 | A1* | 10/2003 | Brown | G06F 11/1068 714/763 |
| 2009/0006900 | A1* | 1/2009 | Lastras-Montano | G11C 29/4401 714/42 |
| 2010/0287445 | A1* | 11/2010 | Dell | G06F 11/1044 714/763 |
| 2016/0132265 | A1 | 5/2016 | Yi et al. | |
| 2017/0192858 | A1* | 7/2017 | Zhang | G06F 11/2017 |
| 2017/0262337 | A1 | 9/2017 | Chang et al. | |
| 2018/0067684 | A1* | 3/2018 | Benisty | G06F 11/1048 |
| 2019/0171520 | A1* | 6/2019 | Cadigan | G06F 11/1048 |
| 2019/0205225 | A1* | 7/2019 | Kim | G06F 13/4239 |
| 2019/0385693 | A1* | 12/2019 | Shin | G11C 29/42 |
| 2020/0201709 | A1* | 6/2020 | Song | G06F 11/1048 |

\* cited by examiner

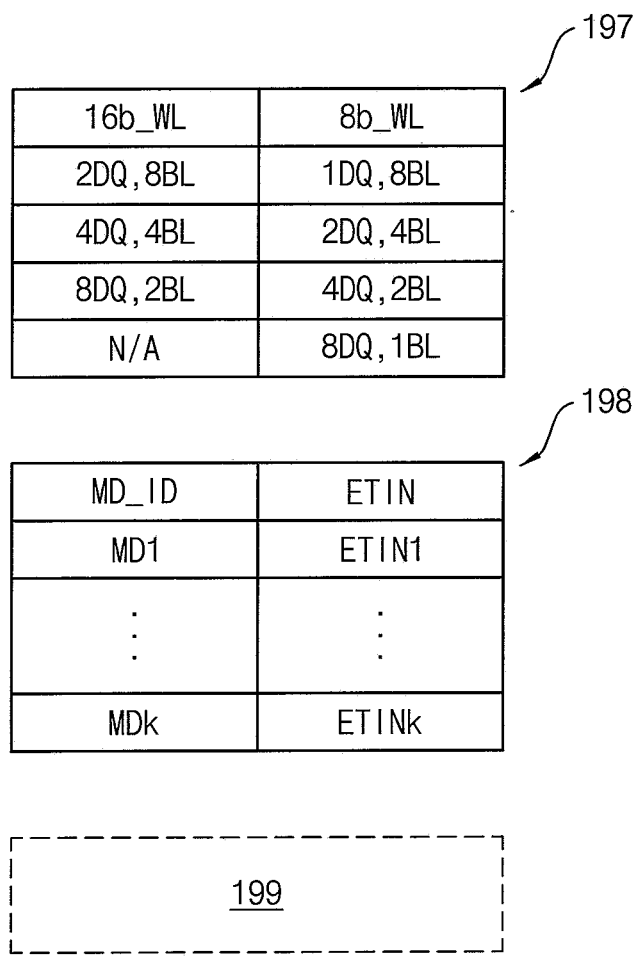
FIG. 3B
DI
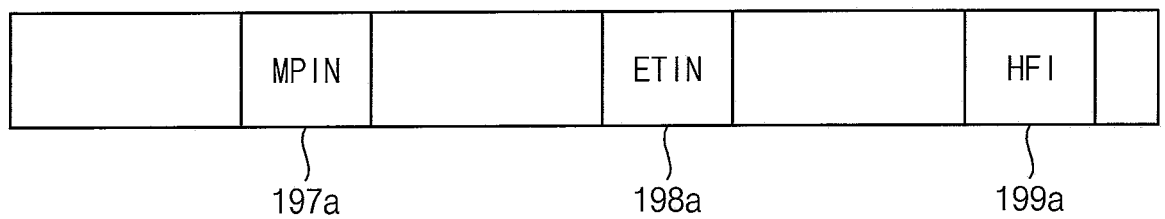

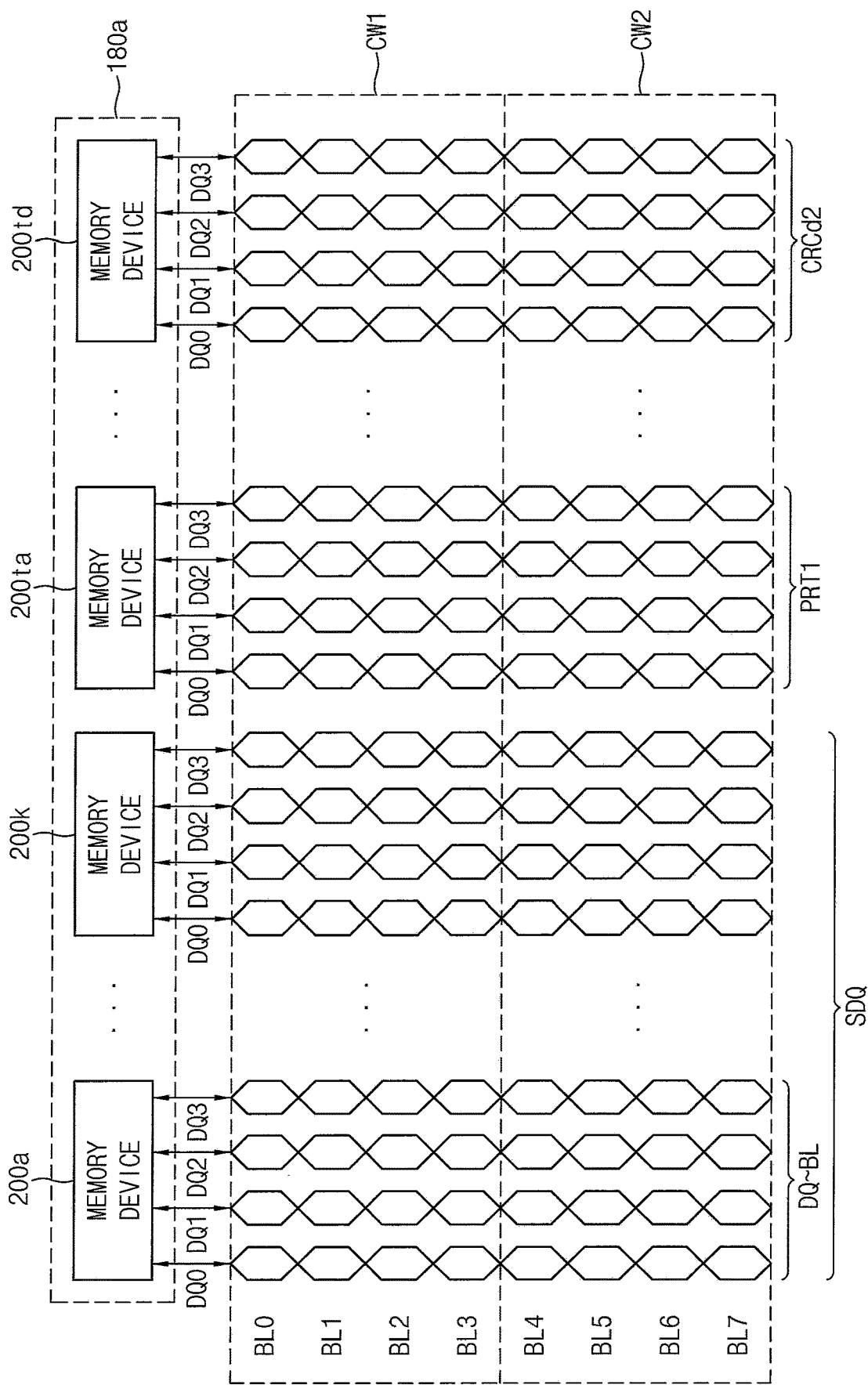

FIG. 10

MEMORY CONTROLLERS, MEMORY SYSTEMS INCLUDING THE SAME AND MEMORY MODULES

CROSS-REFERENCE TO RELATED APPLICATIONS

This application claims priority under 35 U.S.C. § 119 to Korean Patent Application No. 10-2019-0137223, filed on Oct. 31, 2019, the disclosure of which is incorporated by reference herein in its entirety.

TECHNICAL FIELD

Exemplary embodiments of the present disclosure relate to memories, and more particularly, to memory controllers, memory systems including the same, and memory modules.

DISCUSSION OF THE RELATED ART

A Memory device may be implemented using a semiconductor such as silicon (Si), germanium (Ge), gallium arsenide (GaAs), indium phosphide (InP), or the like. Memory devices are typically divided into volatile memory devices and nonvolatile memory devices.

A volatile memory device refers to a memory device in which stored data is lost when a power supply is shut down. On the other hand, a nonvolatile memory device refers to a memory device that retains stored data when a power supply is shut down. Because a dynamic random access memory (DRAM), which is a kind of volatile memory device, has a high access speed, the DRAM is widely used as a working memory, a buffer memory, a main memory, or the like of a computing system.

A plurality of memory chips (e.g., DRAM) are implemented with a memory module for high performance and large volume.

SUMMARY

Exemplary embodiments provide a memory controller capable of increasing error correction capability.

Exemplary embodiments provide a memory system capable of increasing error correction capability.

Exemplary embodiments provide a memory module capable of increasing error correction capability.

According to an exemplary embodiment of the present invention, a memory controller configured to control a memory module including a plurality of memory devices which constitute a first channel and a second channel includes an error correction code (ECC) engine, and a control circuit configured to control the ECC engine. The ECC engine is configured to generate a codeword including a plurality of symbols by adaptively constructing, based on device information including mapping information, each of the plurality of symbols from a predetermined number of data bits received via a plurality of input/output pads of each of the plurality of memory devices, and transmit the codeword to the memory module. The mapping information indicates whether each of the plurality of input/output pads is mapped to the same symbol among the plurality of symbols or different symbols among the plurality of symbols. Each of the plurality of symbols corresponds to a unit of error correction of the ECC engine.

According to an exemplary embodiment of the present invention, a memory system includes a first memory module including a plurality of memory devices which constitute a first channel and a second channel, and a serial presence detect (SPD) device that stores first mapping information as a device information, and a memory controller configured to control the first memory module. The memory controller includes an error correction code (ECC) engine and a control circuit configured to control the ECC engine. The ECC engine is configured to generate a codeword including a plurality of symbols by adaptively constructing, based on the first mapping information, each of the plurality of symbols from a predetermined number of data bits received via a plurality of input/output pads of each of the plurality of memory devices and transmit the codeword to the first memory module. The first mapping information indicates whether each of the plurality of input/output pads is mapped to the same symbol among the plurality of symbols or different symbols among the plurality of symbols. Each of the plurality of symbols corresponds to a unit of error correction of the ECC engine.

According to an exemplary embodiment of the present invention, a memory system includes a memory module including a plurality of memory devices which constitute a first channel and a second channel, and a serial presence detect (SPD) device that stores a first hard fail information and a second hard fail of the first channel and the second channel, respectively, as a device information, and a memory controller configured to control the memory module. The memory controller includes an error correction code (ECC) engine configured to generate a codeword including a plurality of symbols from a plurality of data bits that are to be stored in the plurality of memory devices and a control circuit configured to control the ECC engine. The first hard fail information indicates a hard fail in the first channel if a number of symbols including an error bit among the plurality of symbols is greater than a reference number and otherwise, indicates a soft fail. The second hard fail information indicates a hard fail in the second channel if a number of symbols including an error bit among the plurality of symbols is greater than the reference number and otherwise, indicates a soft fail. Each of the plurality of symbols includes a predetermined number of data bits received via a plurality of input/output pads of each of the plurality of memory devices. The ECC engine, in response to at least one of the first hard fail information and the second hard fail information, increases a number of error detection/correction bits in the codeword. The at least one of the first hard fail information and the second hard fail information indicates that the number of symbols including the error bit is greater than the reference number in at least one of the plurality of memory devices in a corresponding channel of the first channel and the second channel.

According to an exemplary embodiment of the present invention, a memory module includes a plurality of memory devices mounted on a module board, wherein each of the plurality of memory devices includes a plurality of input/output pads through which a predetermined number of data bits are received or outputted in a burst operation, and a plurality of error correction code (ECC) devices mounted on the module board. The memory module is configured to transfer mapping information to a memory controller external to the memory module as a device information. The mapping information indicates whether each of the plurality of input/output pads is mapped to the same symbol among a plurality of symbols in a codeword or different symbols thereof.

According to an exemplary embodiment of the present invention, a memory system includes a plurality of memory devices, each of the plurality of memory devices including M input/output pads, a memory controller configured to cause each of the plurality of memory devices to operate in a burst operation with an N burst length, wherein each of the plurality of memory devices stores or receives N bits consecutively via each of the M input/output pads in the burst operation and generate a plurality of codewords from a data set that is to be stored in the plurality of memory devices in the burst operation, wherein each of the plurality of codewords includes a plurality of symbols, and construct each of the plurality of symbols from the data set according to a mapping information. The mapping information indicates whether each of the M input/outputs is mapped to the same symbol among the plurality of symbols or different symbols among the plurality of symbols.

According to exemplary embodiments, an ECC engine in a memory controller constitutes codeword based on information of memory chips mounted on a memory module such that a number of symbols including an error bit in a user data set stored in the memory chips, is equal to or smaller than a reference number. Therefore, a memory system may increase reliability, availability and serviceability by increasing error correction capability of the ECC engine.

BRIEF DESCRIPTION OF THE DRAWINGS

The above and other features of the present disclosure will become more apparent by describing in detail exemplary embodiments thereof with reference to the accompanying drawings.

FIG. 3A illustrates an example of the information table in the memory module in FIG. 1 according to exemplary embodiments.

FIG. 3B illustrates an example of the device information in the memory system of FIG. 1.

FIG. 4 is a diagram illustrating a burst operation of the memory system of FIG. 1 according to exemplary embodiments.

FIG. 10 is a diagram illustrating a data structure in which an error correction algorithm is performed according to exemplary embodiments.

DETAILED DESCRIPTION OF THE EMBODIMENTS

Figure 1:
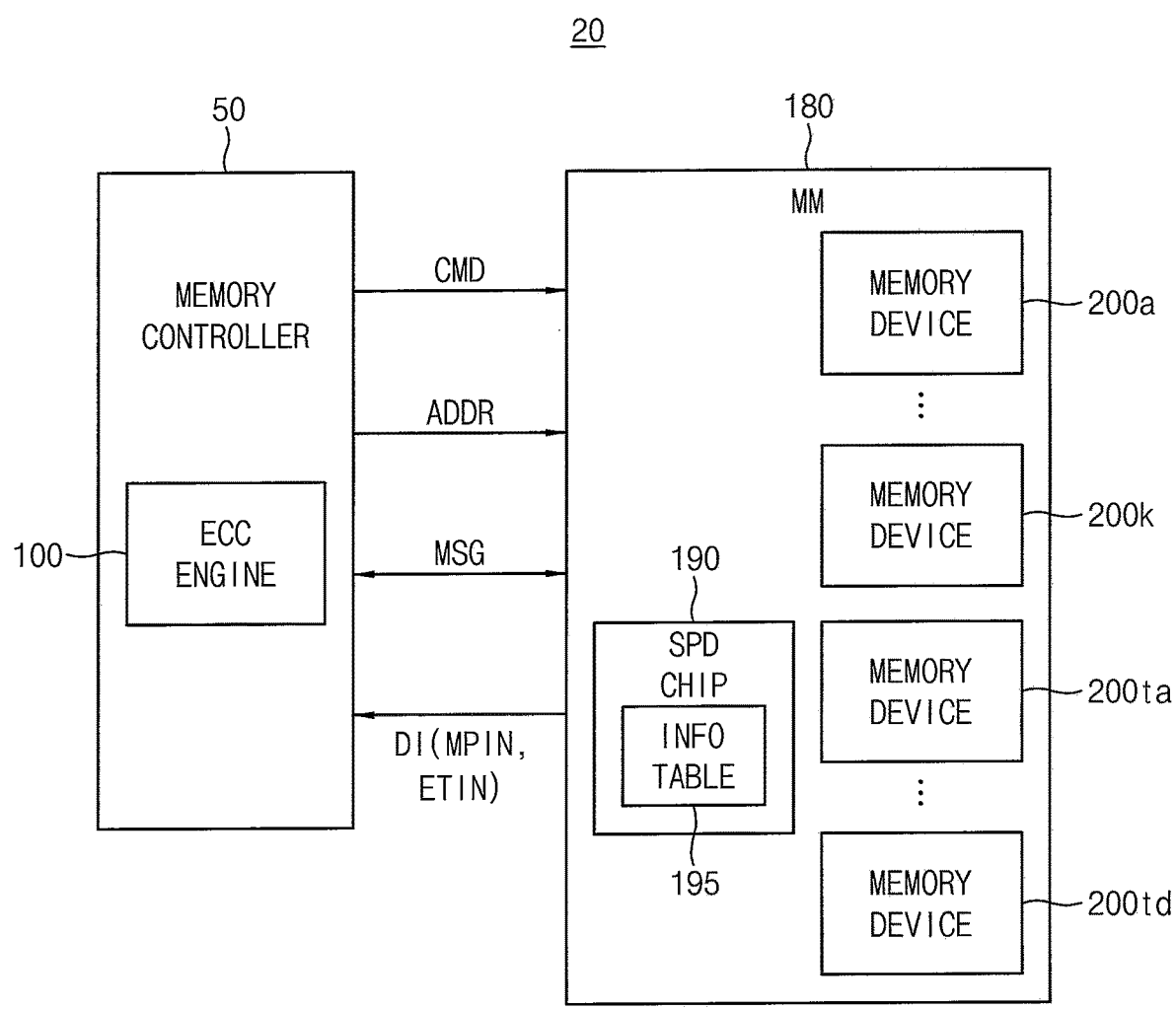
FIG. 1 is a block diagram illustrating a memory system according to exemplary embodiments.

Exemplary embodiments of the present disclosure will be described more fully hereinafter with reference to the accompanying drawings. Like reference numerals may refer to like elements throughout the accompanying drawings.

FIG. 1 is a block diagram illustrating a memory system according to exemplary embodiments.

Referring to FIG. 1, a memory system 20 may include a memory controller 50 and a memory module 180. The memory module 180 includes a plurality of memory chips 200a~200k, 200ta~200td. The plurality of memory chips 200a~200k, 200ta and 200tb include a plurality of data chips 200a~200k, and a plurality of error correction code (ECC) chips 200ta~200td.

The memory controller 50 may control an overall operation of the memory system 20. The memory controller 50 may control an overall data exchange between a host and the plurality of memory chips 200a~200k, 200ta and 200tc. For example, the memory controller 50 may write data to the plurality of memory chips 200a~200k, 200ta and 200tc or read data from the plurality of memory chips 200a~200k, 200ta and 200tc in response to a request from the host. In addition, the memory controller 50 may issue operation commands to the plurality of memory chips 200a~200k, 200ta~200td for controlling the plurality of memory chips 200a~200k, 200ta~200td.

In exemplary embodiments, each of the plurality of memory chips 200a~200k, 200ta~200td may include a dynamic random access memory (DRAM) having volatile memory cells. The memory chips 200a~200k may be referred to as data chips, and the memory chips 200ta~200td may be referred to as ECC chips. In an exemplary embodiment, each of the memory chips 200a~200k, 200ta~200td may have four input/output pads (i.e., 4 bits width). The present invention is not limited thereto. In an exemplary embodiment, each of a plurality of memory chips in a memory module may be 8 bits wide. Although the memory devices 200a~200k and 200ta~200td are described as chips, they may be memory devices in the form of chips, or in the form of packages including one or more chips stacked on a package substrate and covered with an encapsulant, or they may be package-on-package devices.

In exemplary embodiments, a number of the data chips 200a~200k may be 16, and a number of the ECC chips may be 4. However, the number of the data chips 200a~200k and the number of the ECC chips are not limited thereto.

The memory controller 50 transmits an address ADDR and a command CMD to the memory module 180 and may exchange a message MSG including a codeword with the memory module 180. In an exemplary embodiment, the memory controller 50 may cause each of the plurality of memory chips 200a~200k, 200ta~200td to operate in a burst operation mode at the same time. In the burst operation mode, each memory chip may output or store a predetermined number of bits consecutively via each of a plurality of input/output pads. The predetermined number of bits corresponds to a burst length of the burst operation. For example, in a burst write operation mode with a burst length of 8, the memory controller 50 may cause each memory chip to store 8 bits consecutively via each of the plurality of input/output pads of each memory chip; and in a burst read operation mode with a burst length of 8, the memory controller may cause each memory chip to output 8 bits consecutively via each of the plurality of input/output pads. In the burst operation, a row address and a starting column address may be given to each of the plurality of memory chips 200a~200k, 200ta~200td, and a column address of each memory chip may internally increase from the starting column address by one column address using a counter, for example, without changing the row address. For a burst length of 8, eight data transfers may occur consecutively via the plurality of input/output pads of each memory chip. A 'beat' may refer to an individual data transfer within the burst operation. For example, in the burst length of 8, the burst operation may have 8 beats. In case that each of the memory chips is four bits wide, each memory chip has each beat with four bits outputted from memory cells with the same row and column addresses.

Figure 12:
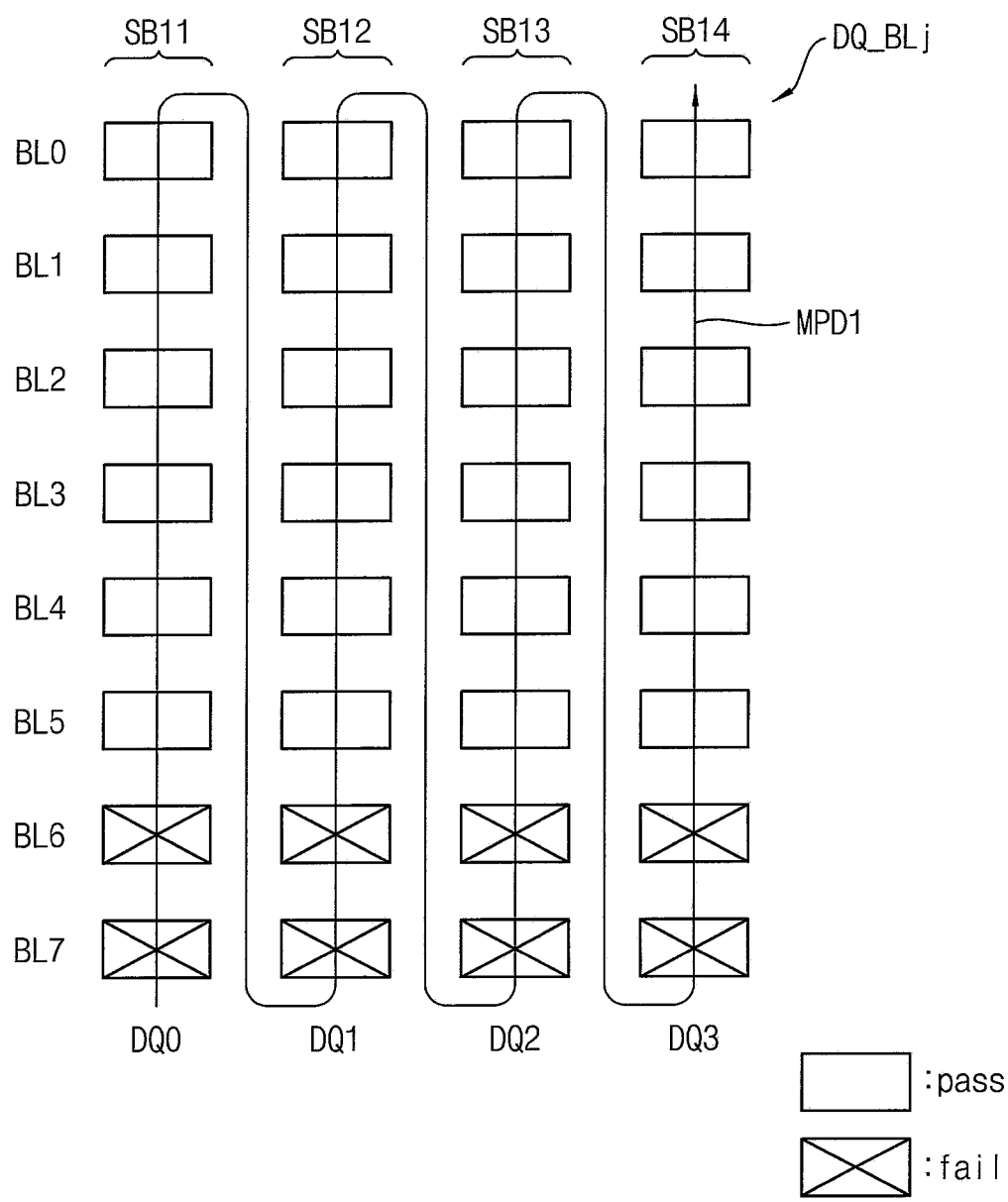
FIG. 12 illustrates a data set including two sub-words, which are input/output to/from one data chip in the memory module of FIG. 4.
Figure 13:
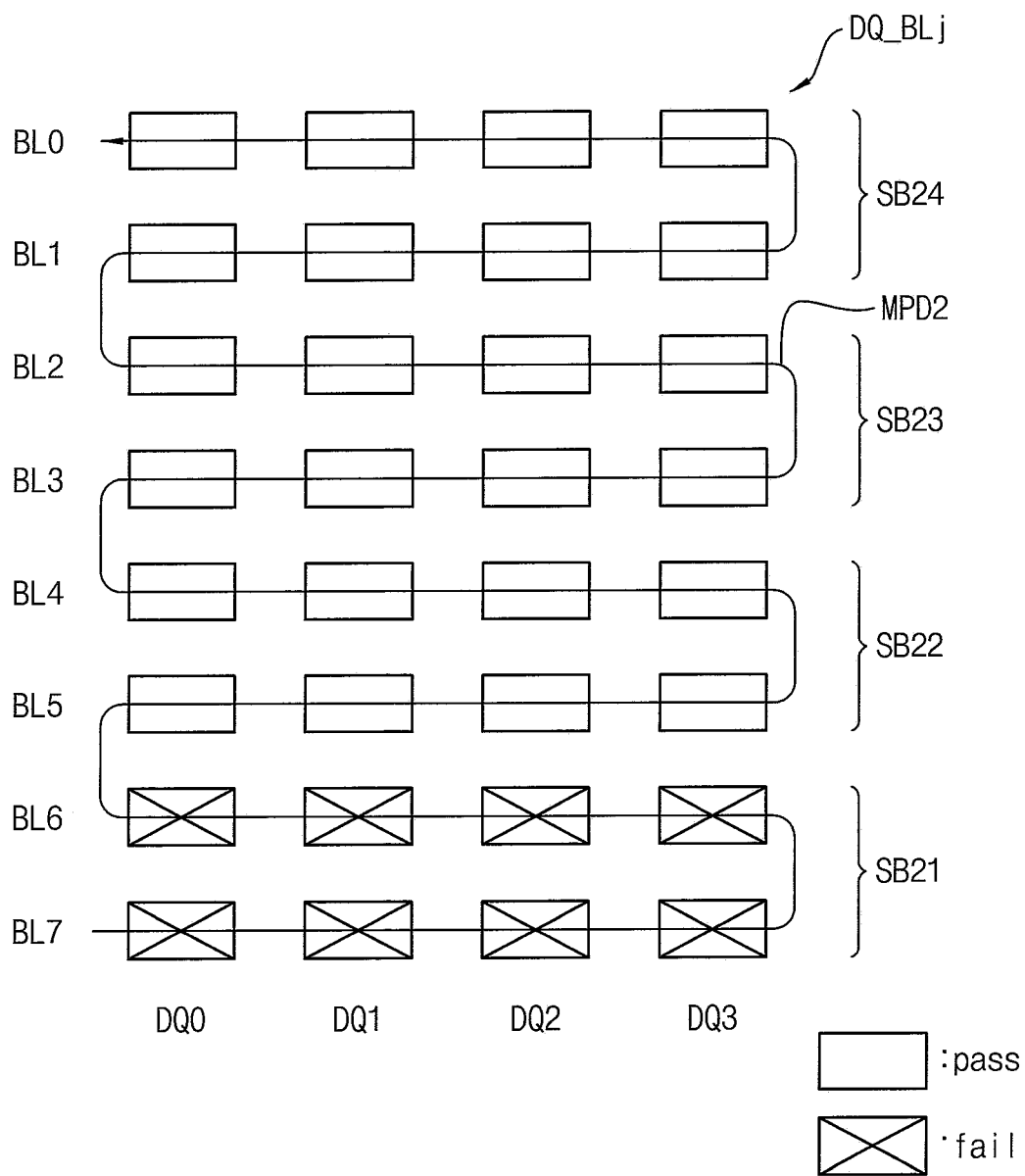
FIG. 13 illustrates a data set including two sub-words, which are input/output to/from one data chip in the memory module of FIG. 4 when the ECC engine constitutes a codeword based on the mapping information.

The memory controller 50 may include an ECC engine 100. In an exemplary embodiment, the ECC engine 100 may operate based on a symbol-based error correcting code (ECC) such as a single symbol correction (SSC) RS code or a single symbol correction and multiple symbol detection (SSCMSD) RS code. For example, the ECC engine 130 may constitute a codeword including a plurality of symbols. The symbol size may be 8 bits, for example. In an exemplary embodiment, the ECC engine may constitute the codeword based on a device information DI from the memory module 180 such that a number of symbols including an error bit, of the plurality of symbols in the codeword, is equal to or smaller than a reference number, and may transmit the codeword to the memory module 180. In an exemplary embodiment where the ECC engine 100 operates using the SSC RS code, the reference number may be one. Each of the plurality of symbols includes a predetermined number (e.g., 8) of data bits of a plurality of data bits included in a user data set which is to be stored in the plurality of memory chips 200a~200k. In an exemplary embodiment, the symbols may be adaptively constructed from the user data set in various manners according to the device information DI. For example, the construction of the symbols may include a first construction mode as shown in FIG. 12 and a second construction mode as shown in FIG. 13. In the first construction mode, each symbol may be constructed per an input/output pad. For example, each input/output pad of a memory chip is mapped to a respective symbol so that each symbol is formed of data bits consecutively stored via or outputted from each input/output pad. In a case where the memory chip with four input/output pads are operated in a burst operation with a burst length of 8, four 8-bits symbols are constructed from each memory chip with four input/output pads. In the second construction mode, each symbol may be constructed using two adjacent beats of a memory chip. For example, a first beat of the two adjacent beats may have 4 bits simultaneously stored via or outputted from the four input/output pads, and a second beat may have another 4 bits simultaneously stored via or outputted from the four input/output pads. For example, the four different input/output pads of the memory chip may be mapped to the same symbol so that a symbol is formed of data bits stored via or outputted from the four different input/output pads. Thus, the two adjacent beats of the memory chip may form an 8-bit symbol. For the convenience of description, it is assumed that a memory chip includes M input/output pads and is operated in a burst operation with an N burst length. In this case, in response to the second construction mode that each of the M input/output is mapped to different symbols, the ECC engine 100 constructs a plurality of symbols such that each symbol includes N/M data bits outputted from each of the M input/output pads. N, M and N/M are integer number, N is greater than or equal to M, and N/M represents that N is divided by M. In an exemplary embodiment, the memory controller 50 may construct a codeword using various symbol construction modes according to the device information DI. For example, the memory controller 50 may perform an ECC operation on a codeword generated from the user data set using the second construction mode and may correct error bits of the user data set which are determined as uncorrectable by an ECC operation using the first construction mode. In an exemplary embodiment, the first construction mode may be a default mode, and depending on the device information DI, the second construction mode may be selectively activated to correct uncorrectable error bits under an ECC operation using the first construction mode.

The device information DI may include mapping information MPIN. The mapping information MPIN may indicate corresponding relationship between the data bits of the user data set outputted or received via input/output pads in each of the plurality of memory chips 200a~200k, 200ta~200td and a plurality of symbols of a codeword. In an exemplary embodiment, the mapping information MPIN may include information including the first construction mode and the second construction mode. For example, the mapping information MPIN may indicate whether in the first symbol construction mode, eight data bits of each 8-bit symbol are formed of data bits from a respective one of the input/output pads of each memory chip in a burst operation or whether in the second construction mode, eight data bits of each 8-bit symbol are formed of data bits from different input/output pads of each memory chip in a burst operation. For ×4 memory chip, in the second symbol construction mode, two consecutive data bits of each input/output are mapped to the same symbol and data reordering (which will be described with reference to FIG. 6) is used for the mapping, and in the first symbol construction mode, 8 consecutive data bits of a single input/output are mapped to the same symbol and no data reordering is necessary.

The device information DI may further include error tendency information ETIN. The error tendency information ETIN may indicate error tendency or error pattern which repeatedly occurs in the user data set of each of the plurality of memory chips 200a~200k, 200ta~200td. In exemplary embodiments, the error tendency information ETIN may be a portion of the mapping information MPIN. The error tendency or the error pattern which repeatedly occurs in the user data set of each of the plurality of memory chips 200a~200k, 200ta~200td may be obtained through testing the plurality of memory chips 200a~200k, 200ta~200td. The ECC engine 100 may constitute the codeword based on the error tendency information ETIN from the memory module 180 such that a number of symbols including an error bit, of the plurality of symbols in the codeword, is equal to or smaller than a reference number, and may transmit the codeword to the memory module 180.

The memory module 180 may further include a serial presence detect (SPD) chip 190 that stores the mapping information MPIN or the mapping information MPIN and the error tendency information ETIN as the device information DI. The SPD chip 190 may include an information table 195 that stores the device information DI.

The mapping information MPIN may be stored as the device information DI in the information table 195 when the memory module 180 is packaged. The error tendency information ETIN may be stored as the device information DI in the information table 195 based on a result of testing the memory chips 200a~200k, 200ta and 200tc during a function test of the memory module 180.

Since the ECC engine 100 configures the codeword based on the mapping information MPIN or the mapping information MPIN and the error tendency information ETIN, the ECC engine 100 may increase error correction capability by adaptively configuring the codeword.

Figure 2:
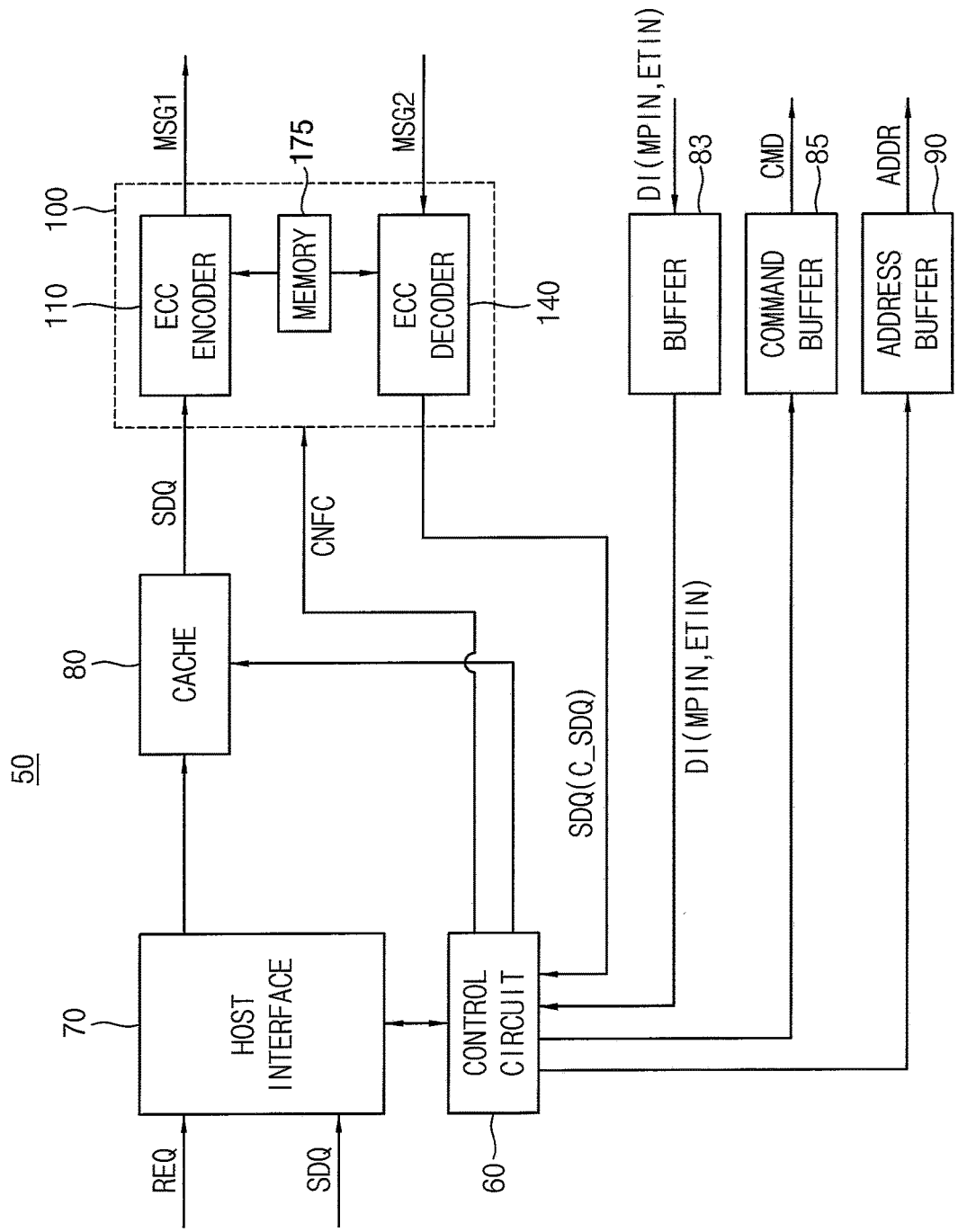
FIG. 2 is block diagram illustrating the memory controller in the memory system of FIG. 1 according to exemplary embodiments.

FIG. 2 is block diagram illustrating the memory controller in the memory system of FIG. 1 according to exemplary embodiments.

Referring to FIG. 2, the memory controller 50 includes a control circuit 60, a host interface 70, a cache 80, the ECC engine 100, a buffer 83, a command buffer 85 and an address buffer 90. The ECC engine 100 includes an ECC encoder 110, an ECC decoder 140 and a memory 175.

The host interface 70 receives a request REQ and a user data set SDQ from the host such as a central processing unit (CPU), and provides the user data set SDQ to the cache 80. The cache 80 provides the user data set SDQ to the ECC engine 100. The cache 80 provides the user data set SDQ to the ECC engine 100 by half of cache line. In an exemplary embodiment, the user data set SDQ may refer to data bits outputted from data chips 200a~200k.

The control circuit 60 receives the device information DI including the mapping information MPIN and the error tendency information ETIN from the buffer 83, and provides a configuration control signal CNFC to the ECC engine 100 based on the mapping information MPIN or the mapping information MPIN and the error tendency information ETIN.

The ECC encoder 110 performs an encoding operation on the user data set SDQ to generate a first message MSG1 including a first codeword and a second codeword, based on the configuration control signal CNFC. The ECC encoder 110 may constitute the codeword such that a number of symbols including an error bit in the user data set SDQ is equal to or smaller than a reference number which is a maximum number of symbols with at least one error bit correctible in a codeword. The ECC engine 100 may determine the reference number according to a symbol-based error correcting code (ECC). In an exemplary embodiment, in case that the symbol-based error correcting code is an SSC RS code, the reference number is 1.

The ECC decoder 140 performs an ECC decoding operation on a second message MSG2 including the first codeword and the second codeword to detect and/or correct errors in the message MSG2 and provides the control circuit 60 with the user data set SDQ stored in the memory module 180 or a corrected user data C_SDQ.

The memory 175 is connected to the ECC encoder 110 and the ECC decoder 140. The memory 175 includes a plurality of ECCs which having different error correction capabilities and provides the ECC encoder 110 and the ECC decoder 140 with a selected ECC among the plurality of ECC in response to the configuration control signal CNFC. In an exemplary embodiment, each of the plurality of ECCs may represent a parity generation matrix. The plurality of ECCs will be described with reference to FIGS. 16 and 17.

The control circuit 60 receives the user data set SDQ or the corrected user data set C_SDQ and controls the ECC engine 100, the command buffer 85 and the address buffer 90. The command buffer 85 stores the command CMD corresponding to the request REQ and transmits the command CMD to the memory module 180 under control of the control circuit 60. The address buffer 90 stores the address ADDR and transmits the address ADDR to the memory module 180 under control of the control circuit 60.

The buffer 83 receives the device information DI including the mapping information MPIN or the mapping information MPIN and the error tendency information ETIN from the memory module 180 during a power-up sequence of the memory module 180 and provides the mapping information MPIN or the mapping information MPIN and the error tendency information ETIN to the control circuit 60. For example, the control circuit 60, in the power-up sequence, may receive the device information DI from the SPD chip 190 of the memory module 180 and generate the configuration control signal CNFC.

FIG. 3A illustrates an example of the information table in the memory module in FIG. 1 according to exemplary embodiments.

Referring to FIG. 3A, the information table 195 may include a first table 197, a second table 198 and a third table 199. In an exemplary embodiment, the information table 195 may be stored in the SPD 190 as shown in FIG. 1.

The first table 197 may store the mapping information MPIN that indicates corresponding relationship between the data bits of the user data set outputted or received via input/output pads in each of the plurality of memory chips 200a~200k and a plurality of symbols of a codeword. The mapping information MPIN may include a number of data input/output pads 1DQ, 2DQ, 4DQ and 8DQ and associated burst lengths 1BL, 2BL, 4BL and 8BL with respect to a number of data bits 16b_WL and 8b_WL which are input/output to/from one word-line (i.e., a memory cell row). As discussed above, the mapping information MPIN may include information including the first construction mode and the second construction mode for constructing (i.e., mapping) each symbol from the user data set.

The second table 198 may store the error tendency information ETIN which indicates error tendency or error pattern which repeatedly occurs in the memory cell row selected for a burst operation of each of the plurality of memory chips 200a~200k. The second table 198 may store error tendency information ETIN1~ETINk as the error tendency information ETIN. Each of the error tendency information ETIN1~ETINk is associated with a respective one of memory identifiers MD1~MDk of the memory chips 200a~200k as a memory identifier MD ID. In an example embodiment, error tendency information of a memory chip in which greatest errors occur, of the memory chips 200a~200k, may be provided to the memory controller 50 as the error tendency information ETIN.

The third table 199 may store hard fail information associated with each of a first channel and a second channel. The first and second channels will be described with reference to FIG. 14. For example, the hard fail information may indicate whether the number of symbols, if constructed in the first symbol construction mode (i.e., a default mode), including an error bit in a codeword is greater than the reference number in a memory chip in a corresponding channel. For simplicity of drawing, FIG. 12 shows a memory chip on a channel having uncorrectable error bits in the ECC operation using the first symbol construction mode. In FIG. 12, an 8-bit symbol may be constructed per an input/out pad basis in the first construction mode. For example, eight data bits outputted, in a burst operation with a burst length of 8, from each of the four input/output pads may form a respective 8-bit symbol. Thus, each symbol may be formed of eight data bits outputted from each input/output and the memory chip has 4 symbol errors, which is greater than the reference number (e.g., 1) in the SSC RS code. Thus, the user data set including the error bits as shown in FIG. 12 are converted to a codeword including symbols constructed according to the first symbol construction mode, and the codeword includes four symbols to which the error bits are distributed. Thus, the codeword may be determined as uncorrectable.

FIG. 3B illustrates an example of the device information in the memory system of FIG. 1.

Referring to FIG. 3B, the device information DI may be formatted in a packet and the packet may include fields 197a, 198a and 199a. The field 197a may store the mapping information MPIN, the field 198a may store the error tendency information ETIN and the field 199a may store the hard fail information HFI.

FIG. 4 is a diagram illustrating a burst operation of the memory system of FIG. 1 according to exemplary embodiments.

Referring to FIG. 4, a memory module 180a may include one memory rank, and one memory rank may include a plurality of x4 memory chips 200a~200k and 200ta~200td. The term "x4" refers to a width of an input/output of a memory chip. To avoid complexity of the drawing, each individual block in FIG. 4 is not separately identified using a respective reference. Instead, only the first individual block and the last individual block are identified with their corresponding references (e.g., 200a and 200k, and 200ta and 200td).

The memory module 180a may include the memory chips 200ta and 200tc that store a parity data and the memory chips 200tb and 200td that store a cyclic redundancy check (CRC) data. For example, when the memory module 180a is an x4 DIIMM having a total bus width of 80 bits, the total number of memory chips of the memory module 180a is 20, and the memory module 180a may include 16x4 data chips 200a~200k, a first parity chip 200ta, a first CRC chip 200tb, a second parity chip 200tc and a second CRC chip 200td. The first parity chip 200ta and the first CRC chip 200tb may be referred to as a first ECC chip and the second parity chip 200tc and the second CRC chip 200td may be referred to as a second ECC chip. The term x4 DIMM may refer to a DIMM having a plurality of 4 bits withs memory chips.

The input/output width of each of x4 memory chips 200a~200k and 200ta~200td is 4 bits. When each of the memory chips 200a~200k and 200ta~200td outputs data, 4-bit data may be output simultaneously through four DQ (data input/output) pads DQ0~DQ3. The 4-bit data may be simultaneously output from each of the memory chips 200a~200k and 200ta~200td, respectively.

The memory chips 200a~200k and 200ta~200td may perform a burst operation. A burst operation may refer to an operation for reading or writing a large amount of data by sequentially decreasing or increasing an address from an initial address received from the memory controller 50. The basic unit for performing a burst operation may be referred to as a burst length (BL).

FIG. 4 illustrates a user data set corresponding to a predetermined burst length in the memory system of FIG. 1, according to exemplary embodiments.

Referring to FIG. 4, each of the data chips 200a~200k and the parity chips 200ta~200td may perform a burst operation. Herein, the burst operation refers to an operation of writing or reading a large amount of data by sequentially increasing or decreasing an initial address provided from the memory controller 50. A basic unit of the burst operation may be referred to as a burst length BL. Referring to FIG. 4, the BL may be 8. The DQ pads DQ0~DQ3 of each of the data chips 200a~200k may input and output eight data bits of beat numbers BL0~BL7 in the burst operation. In a burst operation of a burst length of 8, a first data transfer is identified with a beat number BL0; the next data transfer is identified with a beat number BL1; and the last data transfer is identified with a beat number BL7. For example, in the case of an x4 DIMM, data input and output per unit task during a burst operation may be 8 (BL)x4 (data bus width)x20 (number of chips), which amounts to a data set of 640 bits. For example, the data set of 640 bits includes a user data set of 512 bits.

The data set of 640 bits may fill one cache line of the memory controller 50. A unit by which error correction is performed may be defined as one codeword. For example, in the error correction mode of x4 DIMM, each error correction may be performed for half cache line. Therefore, the basic unit of a burst operation for filling one cache line may include two codewords. The ECC engine 100 of the memory controller 50 may implement an error correction algorithm with respect to 320-bit data of each of a first codeword CW1 and a second codeword CW2.

In FIG. 4, the data input/output to/from the data chip 200a corresponds to a user data DQ_BL, overall data input/output to/from the data chips 200a~200k corresponds to the user data set SDQ, the data input/output to/from the first parity chip 200ta corresponds to a first sub parity data PRT1, the data input/output to/from the second parity chip 200tc corresponds to a second sub parity data, the data input/output to/from the first CRC chip 200tb corresponds to a first sub CRC data, and the data input/output to/from the second CRC chip 200td corresponds to a second sub CRC data CRCd2.

Figure 5:
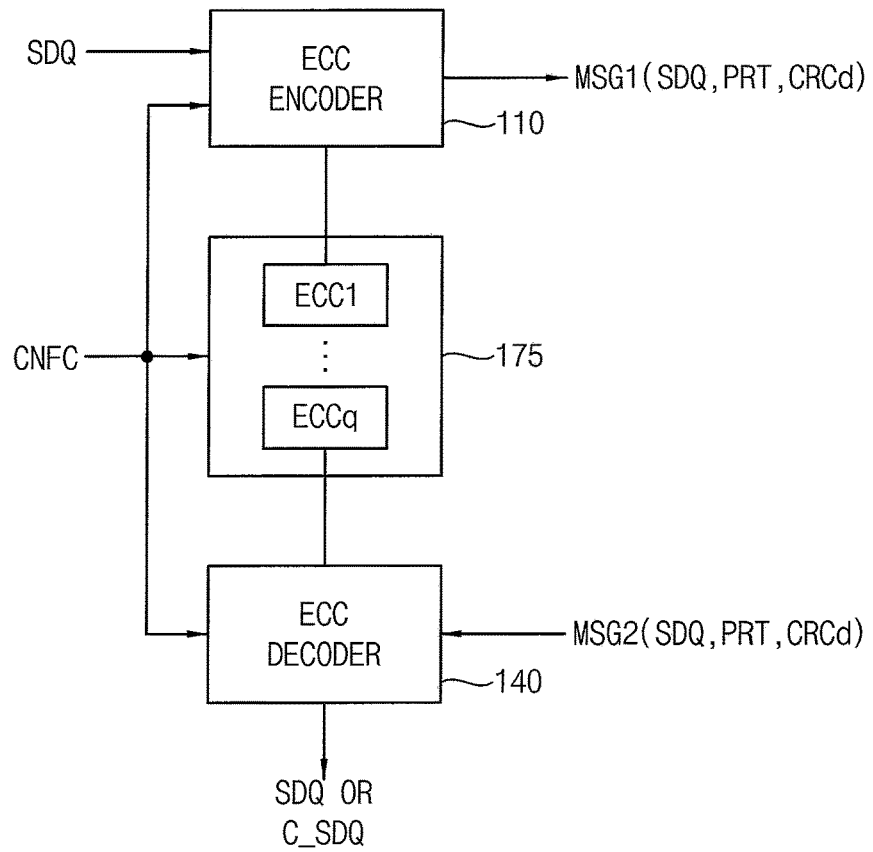
FIG. 5 is a block diagram illustrating an example of the ECC engine in FIG. 2 according to exemplary embodiments.

FIG. 5 is a block diagram illustrating an example of the ECC engine in FIG. 2 according to exemplary embodiments.

Referring to FIG. 5, the ECC engine 100 includes an ECC encoder 110, an ECC decoder 140 and a memory 175.

The memory 175 is connected to the ECC encoder 110 and the ECC decoder 140 and may store a plurality of ECCs EEC1~ECCq. Here, q is an integer greater than one. The memory 175 may provide the ECC encoder 110 and the ECC decoder 140 with a selected ECC of the plurality of ECCs EEC1~ECCq in response to the configuration control signal CNFC.

The ECC encoder 110 may perform an encoding (error correction algorithm encoding) on the user data set SDQ by using the selected ECC to generate a CRC data CRCd and a parity data PRT and may provide the first message MSG1 including the user data set SDQ, the CRC data CRCd and the parity data PRT.

The ECC decoder 140 may perform an error correction algorithm decoding on the second message MSG2 including the user data set SDQ, the CRC data CRCd and the parity data PRT by using the selected ECC to output the user data set SDQ or to output the corrected user data set C_SDQ by correcting at least one error bit in the user data set SDQ.

Figure 6:
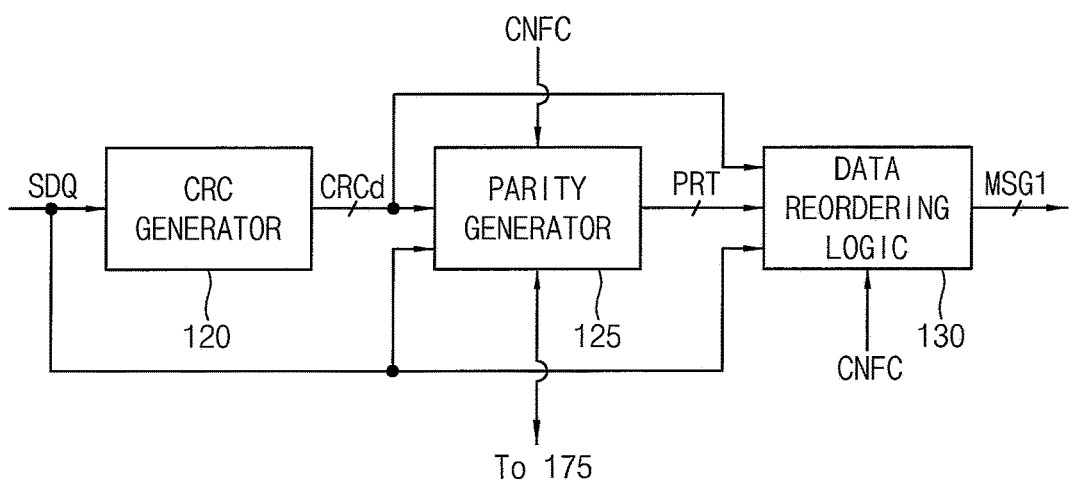
FIG. 6 is an example of the ECC encoder in the ECC engine of FIG. 5 according to exemplary embodiments.

FIG. 6 is an example of the ECC encoder in the ECC engine of FIG. 5 according to exemplary embodiments.

Referring to FIG. 6, the ECC encoder 110 may include a CRC generator 120, a parity generator 125 and a data reordering logic circuit 130.

The CRC generator 120 generates the CRC data CRCd based on the user data set SDQ and provides the CRC data CRCd to the parity generator 125. The parity generator 125 is connected to the memory 175 and generates the parity data PRT by performing ECC encoding on the user data set SDQ and the CRC data CRCd by using the selected ECC. The parity generator 125 may increase a number of bits in the parity data PRT in response to the configuration control signal CNFC. The detailed description of the increase in the number of bits in the parity data PRT may be made with reference to FIGS. 16 and 17.

The data reordering logic circuit 130 rearranges the user data set SDQ, the CRC data CRCd and the parity data PRT such that the number of symbols including an error bit is reduced in response to the configuration control signal CNFC to generate the first message MSG and provides the first message MSG1 to the memory module 180. In an exemplary embodiment, according to the configuration control signal CNFC, the data reordering logic circuit 130 may adaptively rearrange the user data set SDQ, the CRC data CRCd and the parity data PRT in the first symbol construction mode or in the second symbol construction mode.

If the configuration control signal CNFC indicates a soft fail that the number of symbols including the error bit is equal to or smaller than the reference number in at least some of the memory chips in the first channel and the second channel, the parity generator 125 may generate a first parity data by using a first ECC among the plurality of ECCs EEC1~ECCq. If the configuration control signal CNFC indicates a hard fail that the number of symbols including the error bit is greater than the reference number in at least some of the memory chips in the first channel and the second channel, the parity generator 125 may generate a second parity data by using a second ECC among the plurality of ECCs EEC1~ECCq. A number of bits in the second parity data is greater than a number of bits in the first parity data.

Figure 7:
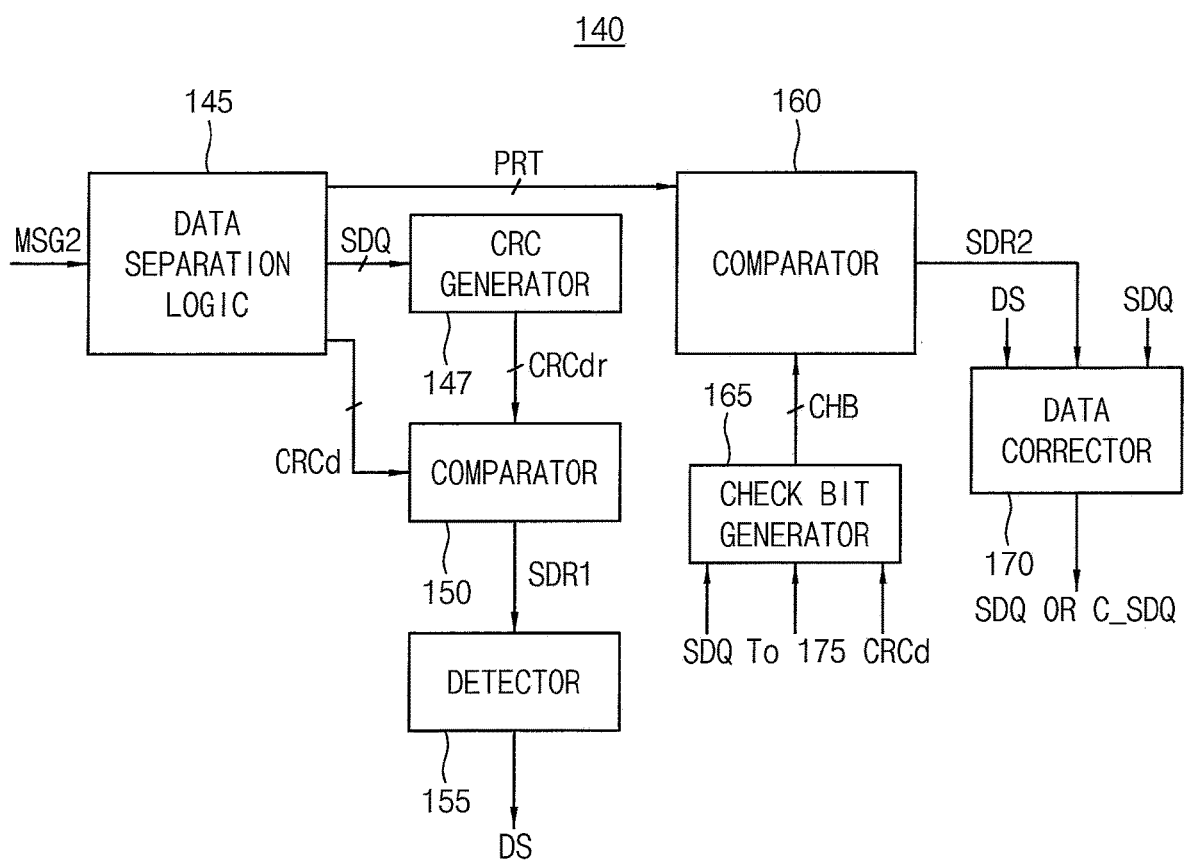
FIG. 7 is an example of the ECC decoder in the ECC engine of FIG. 5 according to exemplary embodiments.

FIG. 7 is an example of the ECC decoder in the ECC engine of FIG. 5 according to exemplary embodiments.

Referring to FIG. 7, the ECC decoder 140 includes a data separation logic circuit 145, a CRC generator 147, a first comparator 150, a detector 155, a second comparator 160, a check bit generator 165 and a data corrector 170.

The data separation logic circuit 145 receives the second message MSG2 from the memory module 180, separates the second message MSG2 into the user data set SDQ, the CRC data CRCd and the parity data PRT, provides the CRC data CRCd to the first comparator 150, provides the user data set SDQ to the CRC generator 147 and the check bit generator 165, and provides the parity data PRT to the second comparator 160.

The CRC generator 147 generates a reference CRC data CRCdr based on the user data set SDQ to provide the reference CRC data CRCdr to the first comparator 150. The first comparator 150 compare the CRC data CRCd and the reference CRC data CRCdr bit-wisely to generate a first syndrome SDR1.

The detector 155 generate a detection signal DS indicating whether the user data set includes at least one error bit based on the first syndrome SDR1.

The check bit generator 165 is connected to the memory 175 of FIG. 5 and generates check bits CHB by performing an ECC decoding operation on the user data set SDQ and the CRC data CRCd by using the selected ECC. The second comparator 160 compares the parity data PRT and the check bits CHB bit-wisely to generate a second syndrome SDR2 indicating whether the error bit occurs in the user data set SDQ and a position of the error bit.

The data corrector 170 receives the user data set SDQ and corrects the at least one error bit in the user data set SDQ based on the second syndrome SDR2 and the detection signal DS by inverting error bit of the data set based on the second syndrome SDR2 and the detection signal DS. The data corrector 170 may output the user data set SDQ or the corrected user data set C_SDQ.

Figure 8:
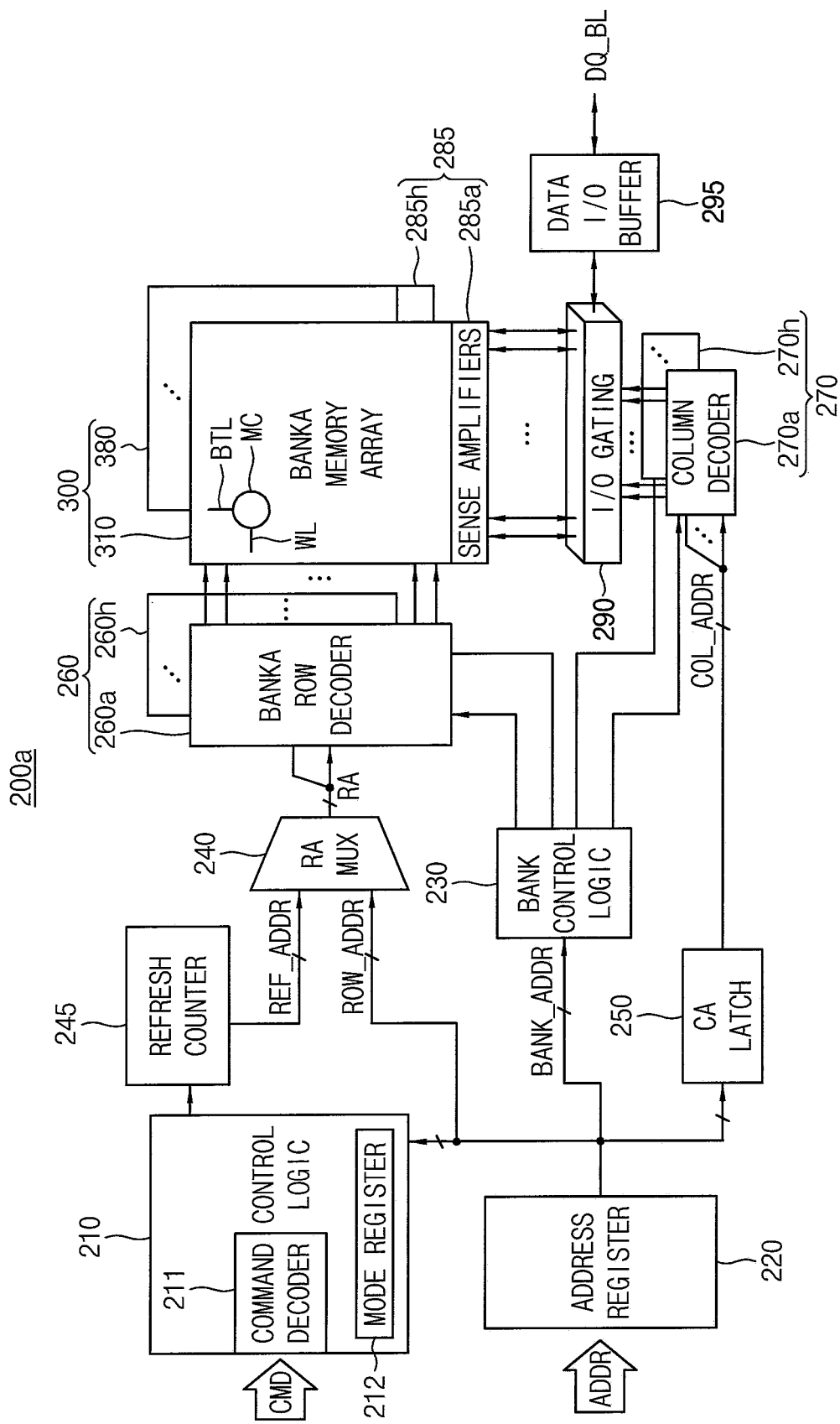
FIG. 8 is a block diagram illustrating one of the data chips in the memory module in FIG. 1 according to exemplary embodiments.

FIG. 8 is a block diagram illustrating one of the data chips in the memory module in FIG. 1 according to exemplary embodiments.

Referring to FIG. 8, the data chip 200a may include a control logic circuit 210, an address register 220, a bank control logic circuit 230, a row address multiplexer 240, a column address latch 250, a row decoder 260, a column decoder 270, a memory cell array 300, a sense amplifier unit 285, an input/output (I/O) gating circuit 290, a data input/output (I/O) buffer 295 and a refresh counter 245.

The memory cell array 300 may include first through eighth bank arrays 310,320,330, 340,350,360,370 and 380.

The row decoder 260 may include first through eighth bank row decoders 260a~260h coupled to the first through eighth bank arrays 310~380, respectively, the column decoder 270 may include first through eighth bank column decoders 270a~270h coupled to the first through eighth bank arrays 310~380, respectively, and the sense amplifier unit 285 may include first through eighth bank sense amplifiers 285a~285h coupled to the first through eighth bank arrays 310~380, respectively.

The first through eighth bank arrays 310~380, the first through eighth bank row decoders 260a~260h, the first through eighth bank column decoders 270a~270h, and the first through eighth bank sense amplifiers 285a~285h may form first through eighth banks. Each of the first through eighth bank arrays 310~380 may include a plurality of word-lines WL, a plurality of bit-lines BL, and a plurality of memory cells MC formed at intersections of the word-lines WL and the bit-lines BTL.

Although the data chip 200a is illustrated in FIG. 8 as including eight banks, the data chip 200a may include any number of banks.

The address register 220 may receive the address ADDR including a bank address BANK_ADDR, a row address ROW_ADDR, and a column address COL_ADDR from the memory controller 50. The address register 220 may provide the received bank address BANK_ADDR to the bank control logic circuit 230, may provide the received row address ROW_ADDR to the row address multiplexer 240, and may provide the received column address COL_ADDR to the column address latch 250.

The bank control logic circuit 230 may generate bank control signals in response to the bank address BANK_ADDR. One of the first through eighth bank row decoders 260a~260h corresponding to the bank address BANK_ADDR may be activated in response to the bank control signals, and one of the first through eighth bank column decoders 270a~270h corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 may be applied to the first through eighth bank row decoders 260a~260h.

The activated one of the first through eighth bank row decoders 260a~260h may decode the row address RA that is output from the row address multiplexer 240, and may activate a word-line WL corresponding to the row address RA. For example, the activated bank row decoder may generate a word-line driving voltage and may apply the word-line driving voltage to the word-line WL corresponding to the row address RA.

The column address latch 250 may receive the column address COL_ADDR from the address register 220, and may temporarily store the received column address COL_ADDR. In exemplary embodiments of the inventive concept, in a burst mode, the column address latch 250 may generate column addresses that increment from the received column address COL_ADDR. The column address latch 250 may apply the temporarily stored or generated column address to the first through eighth bank column decoders 270a~270h.

The activated one of the first through eighth bank column decoders 270a~270h may decode the column address COL_ADDR that is output from the column address latch 250, and may control the I/O gating circuit 290 to output data corresponding to the column address COL_ADDR.

The I/O gating circuit 290 may include circuitry for gating input/output data. The I/O gating circuit 290 may further include read data latches for storing data that is output from the first through eighth bank arrays 310~380, and write control devices for writing data to the first through eighth bank arrays 310~380.

Data to be read from one of the first through eighth bank arrays 310~380 may be sensed by a sense amplifier coupled to the one bank array from which the data is to be read, and may be stored in the read data latches.

The data stored in the read data latches may be provided to the memory controller 50 via the data I/O buffer 295. Data set DQ_BL to be written in one of the first through eighth bank arrays 310~380 may be provided to the data I/O buffer 295 from the memory controller 50. The data I/O buffer 295 may provide the data set DQ_BL to the I/O gating circuit 290.

The control logic circuit 210 may control operations of the memory chip 200a. For example, the control logic circuit 210 may generate control signals for the memory chip 200a to perform the write operation or the read operation. The control logic circuit 210 may include a command decoder 211 that decodes the command CMD received from the memory controller 50 and a mode register 212 that sets an operation mode of the data chip 200a. In exemplary embodiments, the mapping information and the error tendency information may be stored in the mode register 212, and information stored in the mode register 212 may be provided to the memory controller 50 in response to a mode register read command from the memory controller 50

Each of the ECC chips 200ta~200td may have substantially the same configuration as the data chip 200a.

Figure 9:
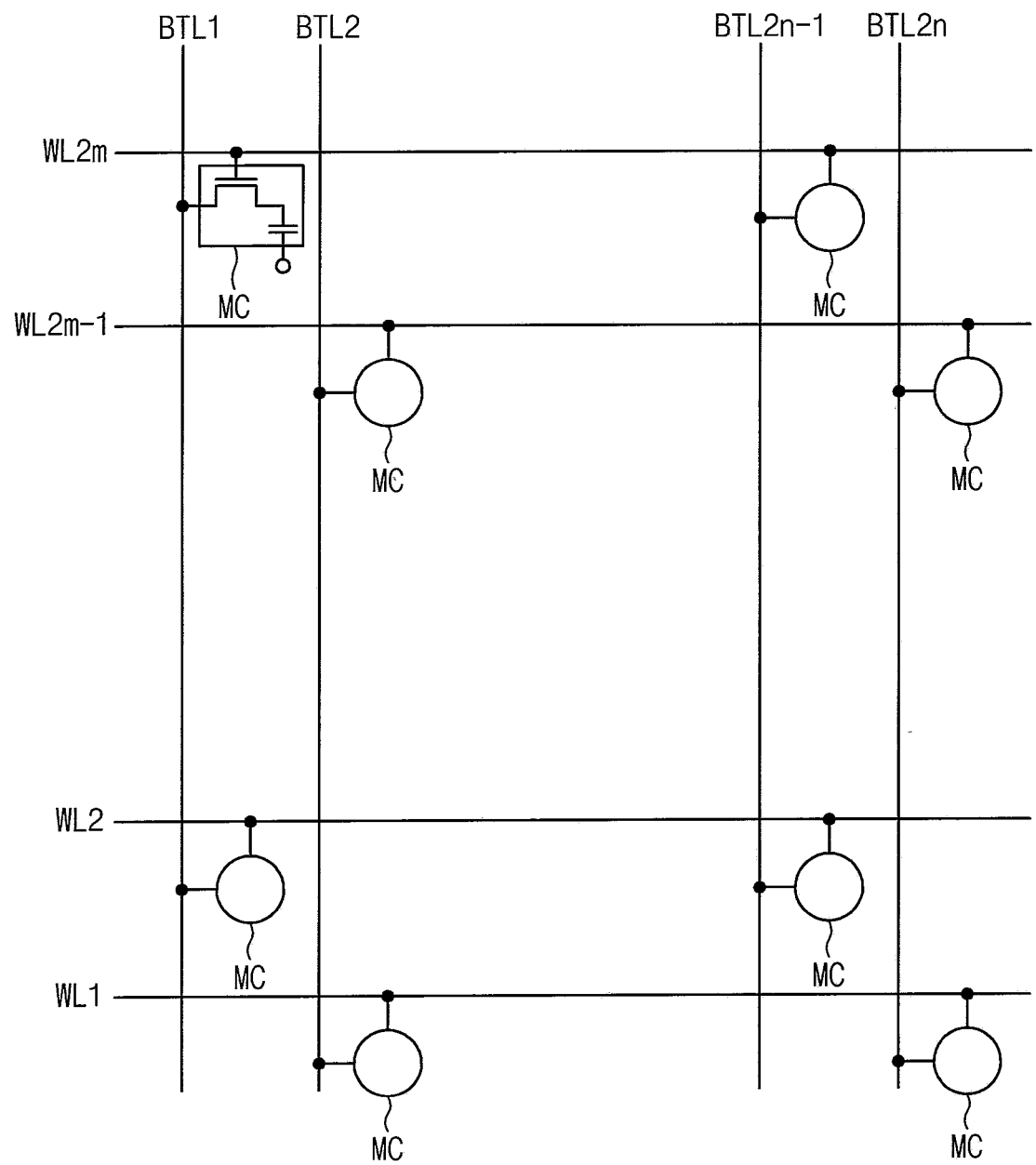
FIG. 9 illustrates a first bank array of the data chip of FIG. 8 according to exemplary embodiments.

FIG. 9 illustrates a first bank array of the data chip of FIG. 8 according to exemplary embodiments.

Referring to FIG. 9, the first bank array 310 includes a plurality of word-lines WL1~WL2m (where m is a natural number greater than two), a plurality of bit-lines BTL1~BTL2n (where n is a natural number greater than two), and a plurality of memory cells MCs disposed near intersections between the word-lines WL1~WL2m and the bit-lines BTL1~BTL2n. In an exemplary embodiment of the inventive concept, each of the plurality of memory cells MCs may include a DRAM cell structure. The plurality of word-lines WL1~WL2m to which the plurality of memory cells MCs are connected may be referred to as rows of the first bank array 310 and the plurality of bit-lines BL1~BL2n to which the plurality of memory cells MCs are connected may be referred to as columns of the first bank array 310.

Figure 10:
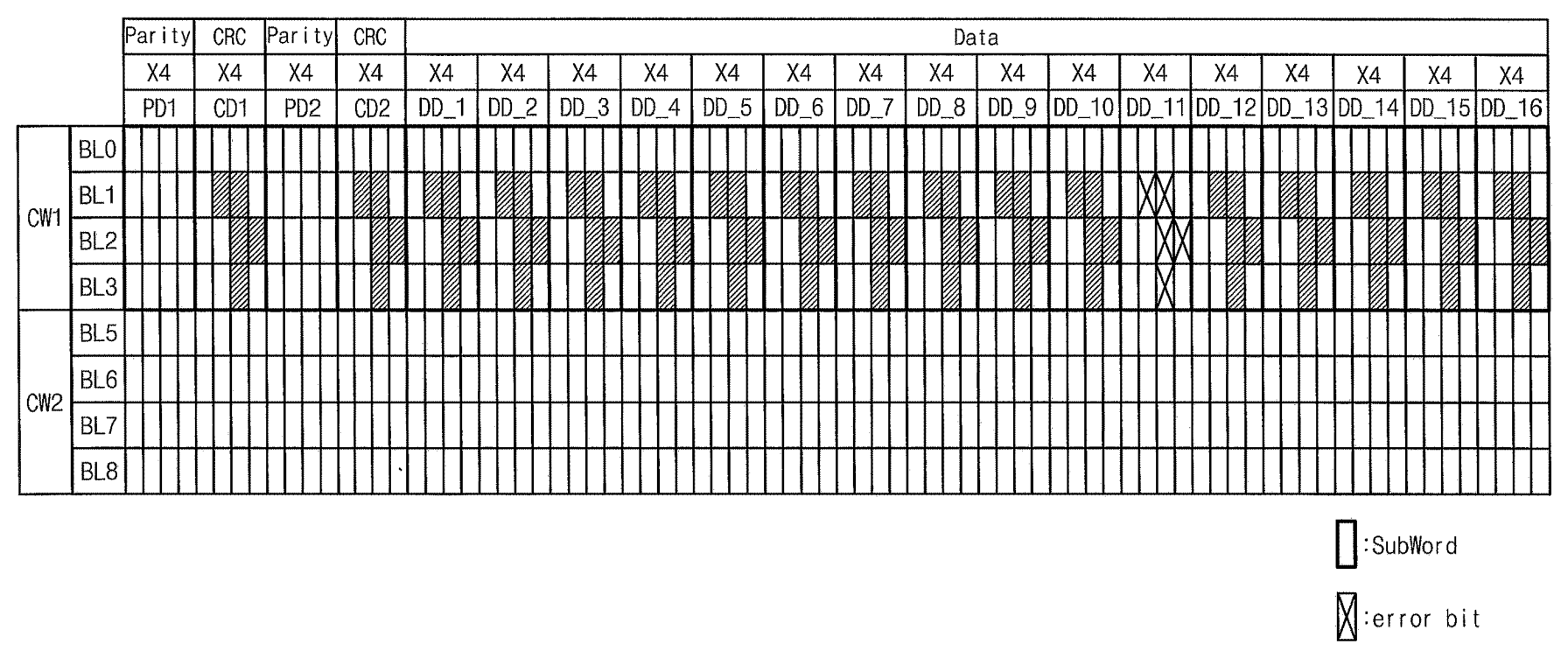

FIG. 10 is a diagram illustrating a data structure in which an error correction algorithm is performed according to exemplary embodiments.

Referring to FIGS. 4 and 10, the memory module 180a may include one memory rank and may be ×4 DIMM including 20×4 memory chips. The memory module 180a may include two parity chips PD1 and PD2 for storing parity data, and two CRC chips CD1 and CD2 for storing CRC data.

The memory module 180a may include 16×4 memory chips DD_1 through DD_16 for storing data. FIG. 10 shows data output from the memory module 180a configured as ×4 ECC DIMM per unit burst operation.

The BL may be 8. A total of 640 bits of data may fill one cache line of the memory controller 50 and constitute two codewords CW1 and CW1. The memory controller 50 may perform an error correction algorithm based on a codeword.

Figure 11:
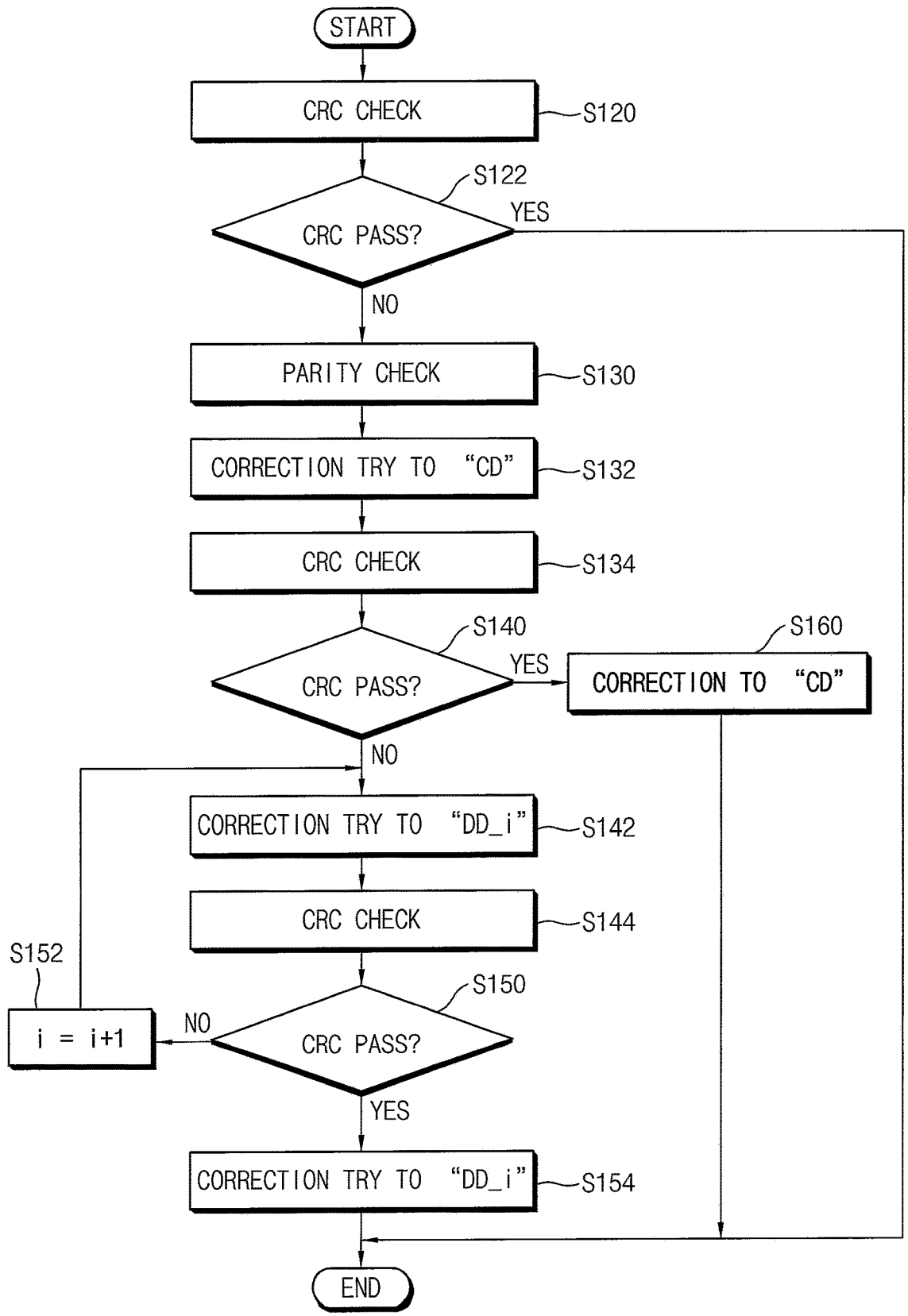
FIG. 11 is a flowchart illustrating a method of performing an error correction algorithm according to exemplary embodiments.

FIG. 11 is a flowchart illustrating a method of performing an error correction algorithm according to exemplary embodiments.

FIG. 11 may be described with reference to FIGS. 4 and 10. A method of detecting and correcting an error bit will be described under an assumption that an error has occurred in an eleventh data chip DD_11 belonging to the first code word CW1 of FIG. 10.

CRC check may be initially performed with respect to a codeword unit (S120). When CRC check is performed with respect to the entire first codeword CW1, pass or failure of the CRC check may be determined (S122). When the CRC check passes, an error correction algorithm may be terminated because there is no error in the first codeword CW1.

When the CRC check fails (S122), there is an error in the first codeword CW1, and thus a next step may be performed to locate an error bit in the memory module 180a.

Therefore, when The CRC check fails, a parity check may be performed (S130). Referring to FIG. 10, for convenience of description, 16-bit data grouped by the data bus width of 4 bits in the first codeword CW1 according to a data bus width may be referred to as a sub-word.

The first codeword CW1 may include a total of 18 sub-words. One parity check may be performed on data corresponding to a same location from among data included in one of the 20 sub-words, and a total of 16 parity checks may be performed. Although the parity check may be an even parity check, the inventive concept is not limited thereto, and the parity check may also be an odd parity check. By performing parity check, the location of an error bit in sub-words may be determined. Referring to FIG. 10, there are errors at bits (hatched portions) existing at locations of (2, 2), (2, 3), (3, 3), (3, 4), and (4, 3) within one sub-word. The first element of the pair represents an I/O identifier of the input/output pads, and the second element represents a beat number. For example, the location of (2,2) represents that a bit of the second I/O and the second third beat is an error bit. After locating the error bit in the sub-word, a next operation may be performed to find out a device with the error bit.

First, correction may be attempted with respect to a sub-word corresponding to a CRC chips CD1 and CD2 (S132). For example, the correction may be performed on the CRC chips CD1 and CD2 based on the assumption that the CRC chips CD1 and CD2 include the error bit in the sub-word. Next, a CRC check may be performed (S134). Pass or failure of the CRC check may be determined (S140). When the CRC check passes, it may be determined that the CRC chips CD1 and CD2 are a device with an error and error correction may be performed on the CRC chips CD1 and CD2 (S160). When the CRC check fails, it may be determined that the CRC chips CD1 and CD2 are not a device with an error, and the process may proceed to a next operation.

Next, correction may be attempted with respect to a sub-word corresponding to a DD_1 data chip (S142). For example, the correction may be performed on the DD_1 data chip based on the assumption that the DD_1 data chip includes the error bit in the sub-word. Next, CRC check may be performed (S144). Then, pass and failure of the CRC check may be determined (S150). When the CRC check passes, it may be determined that the DD_1 data chip is a device with an error and error correction may be performed on the DD_1 data chip (S154).

When the CRC check fails, it may be determined that the DD_1 data chip is not a device with the error bit in the sub-word, and the process may proceed to a next operation. Next, since it is desired to attempt correction with respect to a sub-word corresponding to a DD_2 data chip, 1 may be added to a sequence factor i (S152). Next, correction may be attempted with respect to a sub-word corresponding to the DD_2 data chip (S142), and operations thereafter may be repeated in the same manner until the CRC check passes.

As a result, it may be determined that there is an error in a device that passed CRC, and a final error correction may be performed with respect to the device (S154). Accordingly, an error correction algorithm that detects and corrects errors existing in a device may be completed. The present inventive concept is not limited thereto. In an example embodiment, other error correction algorithms may also be performed in the error correction mode. Thus, error correction algorithms are not limited to the algorithm described in FIG. 11. Hereinafter, it is assumed that the memory controller uses a single symbol correction code with an 8-bit symbol to provide chipkill-correct on x4 DRAM chips. With the single symbol correction, single symbol errors may be corrected.

FIG. 12 illustrates a data set including two sub-words, which are input/output to/from one data chip in the memory module of FIG. 4.

Referring to FIG. 12, a data set DQ_BLj is input/output to/from one data chip by a unit of a sub-word (e.g., 32 data bits obtained from a x4 DRAM chip in a burst operation with a burst length BL of 8). An 8-bit symbol is provided from memory cells in a burst operation of the data chip. For example, an x4 chip may transfer, via the input/output pads DQ0 to DQ3, the data set DQ_BLj bit-by-bit over multiple cycles in a burst operation with a burst length of 8. In FIG. 12, each of the input/output pads DQ0 to DQ3 may be mapped to a respective symbol of four symbols SB11 to SB14. It is assumed that each of the input/output pads DQ0 to DQ3 includes two bit errors located in the beat numbers BL6 and BL7.

When the 8-bit symbol is constructed along a first mapping direction MPD1 (i.e., in the first symbol construction mode), each of symbols SB11, SB12, SB13 and SB14 is mapped to a respective one of data input/output (I/O) pads DQ0~DQ3 and the fail bits are included in each of the symbols SB11, SB12, SB13 and SB14. Therefore, the ECC engine 100 in the memory controller 50 cannot errors in the data set DQ_BLj. The first mapping direction MPD1 is a direction to make each of the symbols SB11, SB12, SB13 and SB14 correspond to respective one of the data I/O pads DQ0~DQ3.

FIG. 13 illustrates a data set including a sub-word (e.g., 32 bits), which is input/output to/from one data chip in the memory module of FIG. 4 when the ECC engine constitutes a codeword based on a mapping information. For the convenience of description, the data set of FIG. 13 has the same error patterns of the data set of FIG. 12.

Referring to FIG. 13, a data set DQ_BLj is input/output to/from one data chip by a unit of a sub-word (e.g., 32 data bits obtained from a x4 DRAM chip in a burst operation with a burst length BL of 8). In an exemplary embodiment, the data set DQ_BL may be mapped into four symbols SB21 to SB22. Two consecutive data beats (e.g., beat numbers BL 6 and BL7, beat numbers BL4 and BL5, beat numbers BL2 and BL3, and beat numbers BL0 and BL1) per each of the four data I/O pads DQ0 to DQ3 may be grouped in the same symbol. For example, a first symbol SB21 may include two consecutive data bits corresponding to data of beat numbers BL6 and BL7 output via the four data I/O pads DQ0 to DQ3 in a burst operation. A second symbol SB22 may include two consecutive data bits corresponding to data of beat numbers BL4 and BL5 output via the four data I/O pads DQ0 to DQ3 in the burst operation. A third symbol SB23 may include two consecutive data bits corresponding to data of beat numbers BL2 and BL3 output via the four data I/O pads DQ0 to DQ3 in the burst operation. A fourth symbol SB24 may include two consecutive data bits corresponding to data of beat numbers BL0 and BL2 output via the four data I/O pads DQ0 to DQ3 in the burst operation. According to the mapping of the present invention, error bits (i.e., fail bits) may be grouped in a single symbol (e.g. SB21) so that the other symbols (e.g., SB22 to SB24) have no error bits.

When the data set DQ_BLj is mapped along a second mapping direction MPD2 (i.e., in the second symbol mapping mode) to the four symbols SB21 to SB24 as shown in FIG. 13, two error bits of each of the data I/O pads DQ0~DQ3 may be mapped in the same symbol SB21 among the four symbols SB21, SB22, SB23 and SB24. Therefore, with the single symbol correction code, the ECC engine 100 in the memory controller 50 may correct the 8 bit errors in the data set DQ_BLj.

Therefore, since the ECC engine 100 of the memory controller 50 constitutes the codeword such that the number of symbols including an error bit is reduced (e.g., from four symbol errors of FIG. 12 to one symbol error of FIG. 13) based on the mapping information MPIN or the mapping information MPIN and the error tendency information ETIN, the ECC engine 100 may increase error correction capability. In exemplary embodiments, if error bits of a sub word-line (e.g., a x4 chip) corresponds a portion of data bits obtained from each of data I/O pads DQ0 to DQ3, the ECC engine 100 constitutes the codeword such that the number of symbols including an error bit is reduced based on the mapping information MPIN.

Figure 14:
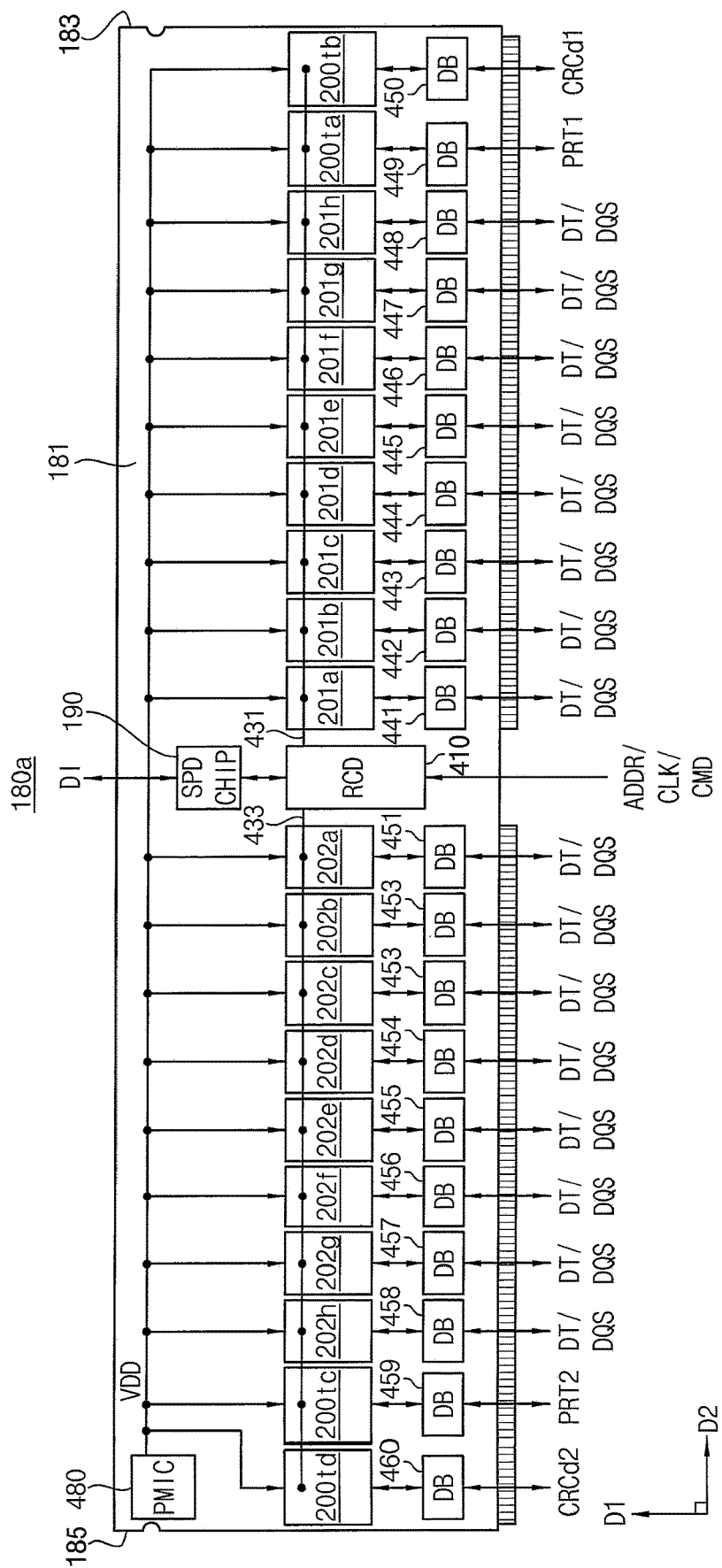
FIG. 14 is a block diagram illustrating an example of the memory module in the memory system of FIG. 1 according to exemplary embodiments.

FIG. 14 is a block diagram illustrating an example of the memory module in the memory system of FIG. 1 according to exemplary embodiments.

Referring to FIG. 14, a memory module 180a includes a registered clock driver (RCD) 410 disposed (or mounted) on a module board 181, a plurality of first data chips 201a~201h, a first parity chip 200ta, a first CRC chip 200tb, a plurality of second data chips 202a~202h, a second parity chip 200tc, a second CRC chip 200td, a plurality of data buffers 441~450 and 451~460, an SPD chip 190 and a power management integrated circuit (PMIC) 480. The first data chips 201a~201h correspond to first through eighth chips and the second data chips 202a~202h correspond to ninth through sixteenth data chips.

Each of the first data chips 201a~201h, the first parity chip 200ta, the first CRC chip 200tb, the second data chips 202a~202h, the second parity chip 200tc and the second CRC chip 200td may be referred to as a memory device. In addition, the first parity chip 200ta and the first CRC chip 200tb may be referred to as a first ECC chip and the second parity chip 200tc and the second CRC chip 200td may be referred to as a second ECC chip.

The module board 181 which is a printed circuit board may extend to a second direction D2, perpendicular to a first direction D1, between a first edge portion 183 and a second edge portion 185 extending in the first direction D1.

The RCD 410 may deliver control signals from the memory controller 50 to the memory devices and the PMIC 480. The RCD 410 may receive a command CMD, an address ADDR and the clock signal CLK from the memory controller 50.

In response to received signals, the RCD 410 may buffer and deliver the control signals to the memory devices such that data of a data signal DT aligned to a data strobe signal DQS is written to the memory devices or such that data stored in the memory devices is outputted as the data signal DT aligned to the data strobe signal DQS. For example, the RCD 410 may transmit the address ADDR, the command CMD, and the clock signal CLK from the memory controller 50 to the memory devices.

The SPD chip 190 may be a programmable read only memory (e.g., EEPROM). The SPD chip 190 may include initial information or device information DI of the memory module 180a. In example embodiments, the SPD chip 190 may include the initial information or the device information DI such as a module form, a module configuration, a storage capacity, a module type, an execution environment, and the like of the memory module 180a. The device information DI may include the mapping information MPIN and the error tendency information ETIN.

When the memory system 20 including the memory module 180a is booted up, the memory controller 50 may read the device information DI from the SPD chip 190 and may recognize the memory module 180a based on the device information DI. The memory controller 50 may control the memory module 180a based on the device information DI from the SPD chip 190. For example, the ECC engine 100 of may constitute the codeword such that the number of symbols including an error bit, in the user data set, is equal to or smaller than a reference number, which is a maximum number of correctable symbols with errors, based on the mapping information MPIN and the error tendency information ETIN included in the device information DI.

The PMIC 480 receives an input voltage VIN, generates a power supply voltage VDD based on the input voltage VIN and provides the power supply voltage VDD to the memory devices. The memory devices operate based on the power supply voltage VDD.

The RCD 410 may be disposed on a center of the module board 181. The first data chips 201a~201h, the first parity chip 200ta and the first CRC chip 200tb may be arranged between the RCD 410 and the first edge portion 183, and the second data chips 202a~202h, the second parity chip 200tc and the second CRC chip 200td may be arranged between the RCD 410 and the second edge portion 185.

Each of the first data chips 201a~201h may be coupled to a corresponding one of the data buffers 441~448 through data transmission line for receiving/transmitting the data signal DT and the data strobe signal DQS. The first parity chip 200ta may be coupled to the data buffer 449 for receiving/transmitting a first sub parity data PRT1. The first CRC chip 200tb may be coupled to the data buffer 450 for receiving/transmitting a first sub CRC data CRCd1. Each of the second data chips 202a~202h may be coupled to a corresponding one of the data buffers 451~458 through data transmission line for receiving/transmitting the data signal DT and the data strobe signal DQS. The second parity chip 200tc may be coupled to the data buffer 459 for receiving/transmitting a second sub parity data PRT2. The second CRC chip 200td may be coupled to the data buffer 460 for receiving/transmitting a second sub CRC data CRCd2.

The RCD 410 may provide a command/address signal to the first data chips 201a~201h, the first parity chip 200ta and the first CRC chip 200tb through a command/address transmission line 431 and may provide a command/address signal to the second data chips 202a~202h, the second parity chip 200tc and the second CRC chip 200td through a command/address transmission line 433.

The SPD chip 190 is disposed to be adjacent to the RCD 410 and the PMIC 480 may be disposed between the second CRC chip 200td and the second edge portion 185.

Figure 15:
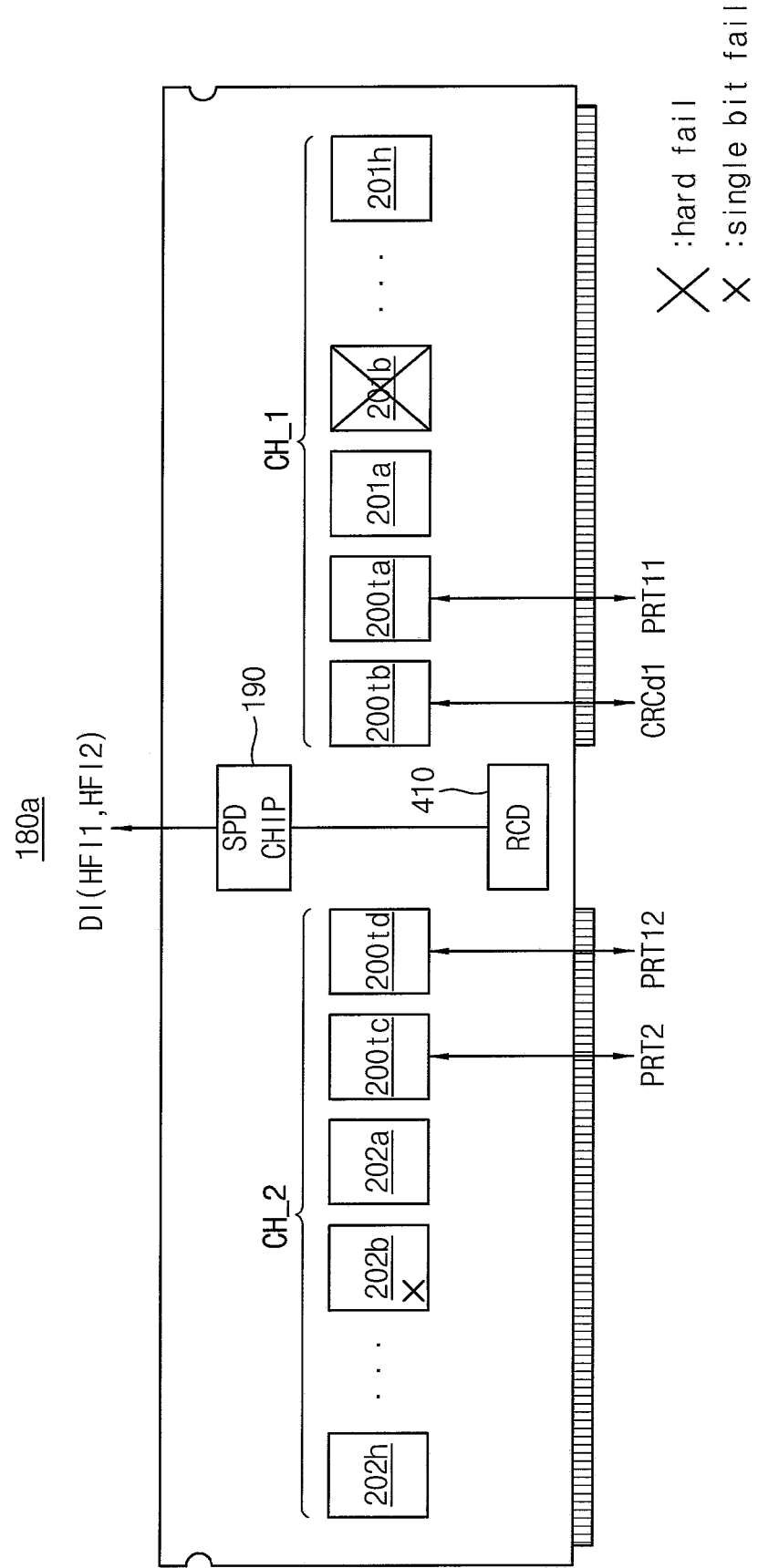
FIG. 15 illustrates that a hard fail occurs in the memory module of FIG. 14 according to exemplary embodiments.

FIG. 15 illustrates that a hard fail occurs in the memory module of FIG. 14 according to exemplary embodiments.

Referring to FIGS. 14 and 15, the first data chips 201a~201h, the first parity chip 200ta and the first CRC chip 200tb may constitute a first channel CH_1 of the memory module 180a and the second data chips 202a~202h, the second parity chip 200tc and the second CRC chip 200td may constitute a second channel CH_2 of the memory module 180a.

The SPD chip 190 is connected to the RCD 410, and the SPD chip 190 stores hard fail information HFI1 and HFI2 in the third table 199 as described with reference to FIG. 3A and provides the memory controller 50 with the hard fail information HFI1 and HFI2 as the device information DI. The hard fail information HFI1 indicates whether the first channel CH_1 includes a memory chip in which uncorrectable hard fail occurs, and hard fail information HFI2 indicates whether the second channel CH_2 includes a memory chip in which uncorrectable hard fail occurs. In FIGS. 14 and 15, it is assumed that the uncorrectable hard fail occurs in the data chip 201b of the first channel CH_1.

The ECC engine 100 in the memory controller 50 generates the parity data PRT2, PRT11 and PRT12 based on the hard fail information HFI1. For example, the ECC engine 100 in the memory controller 50 generates a parity data associated with the data chip 201b of the first channel CH_1 such that a number of parity bits in the parity data PRT11 and the parity data PRT12 are increased for correcting errors in the memory device 201b and the parity data PRT11 and the parity data PRT12 are stored in the first parity chip 201*ta* and the second CRC chip 200*td*, respectively. For example, the second CRC chip 200*td* stores the parity data PRT12 associated with the first channel CH_1 having a memory chip with a hard fail instead of the second sub CRC data CRCd2.

The ECC engine 100 in the memory controller 50 may correct data of the data chip 202*b* in which a soft fail occurs using the hard fail information HFI1 and HFI2. For example, in FIG. 15 where the chip 202*b* has a soft fail and the hard fail information HFI1 indicates that the first channel has a memory chip with a soft fail, the ECC engine 100 generates a parity data PRT2 for soft fail that occurred on the chip 202*b* of the second channel and stores the parity data PRT2 in the second parity chip 200*tc*. According to an exemplary embodiment, with the configuration control signal CNFC indicating a hard fail that the number of symbols including the error bit is greater than the reference number in at least some of the memory chips in the first channel and the second channel, a parity generator 125 may generate a second parity data by using a second ECC among the plurality of ECCs EEC1~ECCq. Otherwise, the parity generator 125 may generate a first parity data using a first ECC. (See, FIGS. 5, 6 and 16 and 17). The number of bits of the second parity data is greater than that of the first parity data.

The hard fail (error) may denote a case where a memory cell is damaged. The soft fail (error) may denote a case where hardware of a memory cell is not damaged, but data of the memory cell temporarily transitions due to alpha particles and so on. The hard fail may be corrected through the spare memory cell or an error correction operation. The soft fail may be corrected through an error correction operation.

Figure 16:
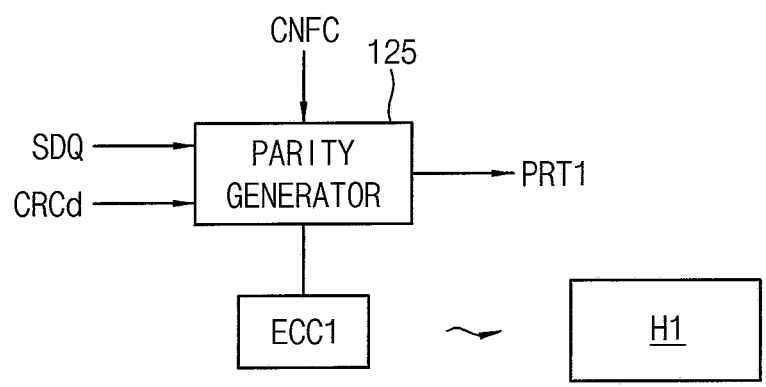
FIGS. 16 and 17 illustrate operations of the parity generator in the ECC encoder of FIG. 6, respectively.
Figure 17:
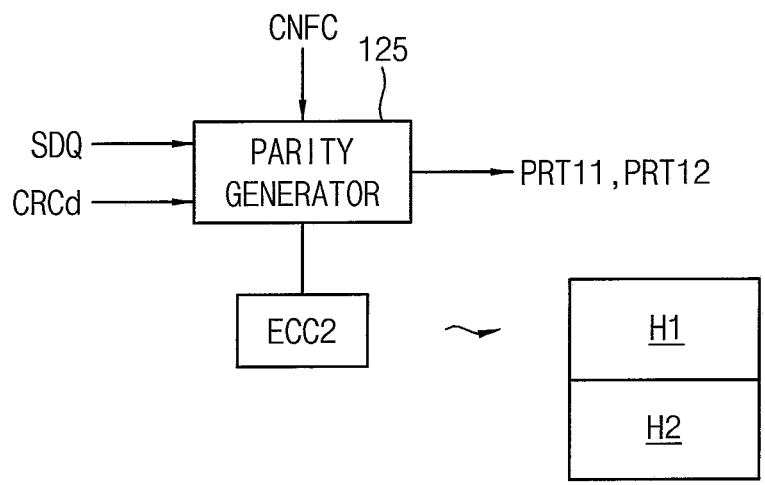

FIGS. 16 and 17 illustrate operations of the parity generator in the ECC encoder of FIG. 6, respectively.

Referring to FIG. 16, the parity generator 125 performs an ECC encoding on the user data set SDQ and the CRC data CRCd using a first ECC ECC1 represented as a first generation matrix H1 in response to the configuration control signal CNFC to generate a first sub parity data PRT1. In FIG. 16, it is assumed that a memory chip of a first channel has a soft error. In case that a memory chip of a second channel has a soft fail, the parity generator 125 may generate a second sub parity data PRT2 as shown in FIG. 15.

Referring to FIG. 17, the parity generator 125 performs an ECC encoding on the user data set SDQ and the CRC data CRCd using a second ECC ECC2 represented as a first generation matrix H1 and a second generation matrix H2 in response to the configuration control signal CNFC to generate the parity data PRT11 and PRT12. The parity data PRT11 corresponds to the first generation matrix H1 and the parity data PRT12 corresponds to the second generation matrix H2, and thus a number of bits in the parity data PRT11 and PRT12 is greater than a number of bits in the first sub parity data PRT1. In FIG. 17, it is assumed that a memory chip of a first channel has a hard fail as shown in FIG. 15. In case that a memory chip of a second channel has a hard fail, the parity generator 125 may generate parity data PRT21 and PRT22.

Figure 18:
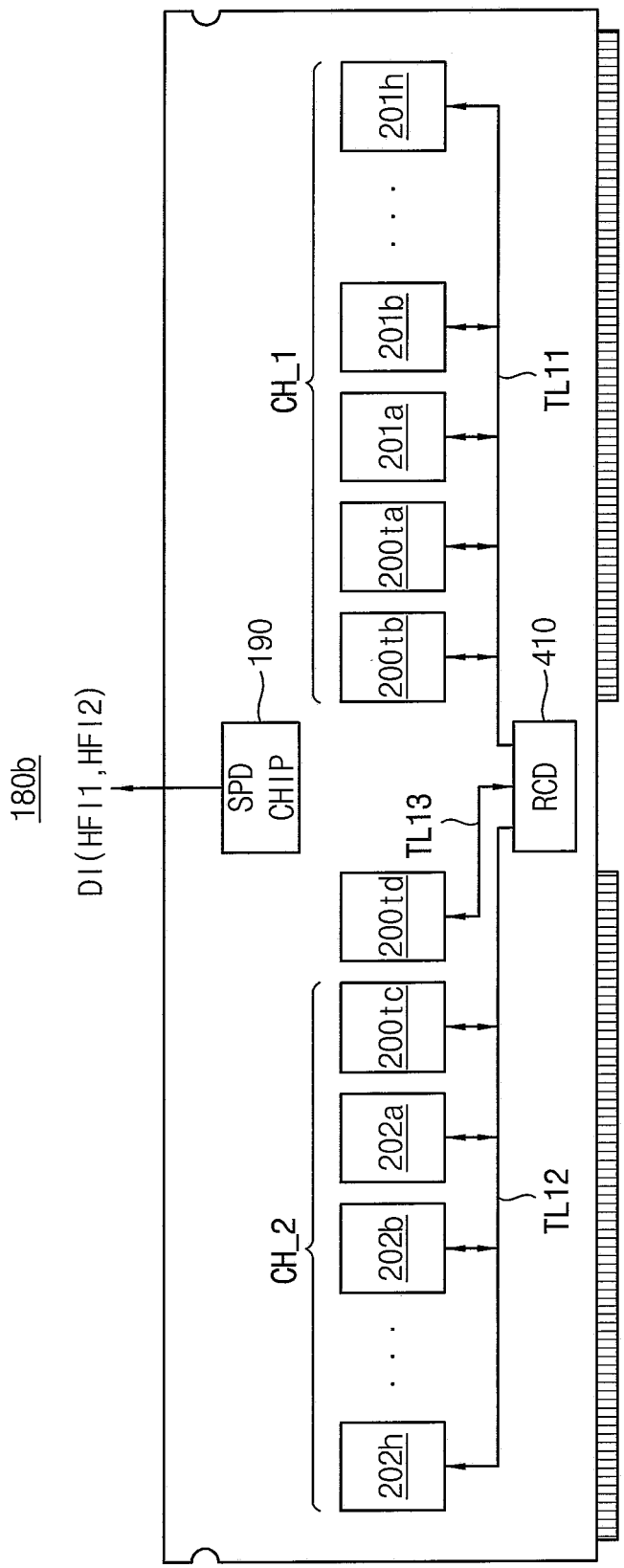
FIG. 18 illustrates an example of the memory module in the memory system of FIG. 1 according to exemplary embodiments.

FIG. 18 illustrates an example of the memory module in the memory system of FIG. 1 according to exemplary embodiments.

Referring to FIG. 18, a memory module 180*b* may include a plurality of first data chips 201*a*~201*h*, a first ECC chip including a first parity chip 200*ta*, a first CRC chip 200*tb*, a plurality of second data chips 202*a*~202*h*, a second ECC chip including a second parity chip 200*tc*, a third ECC chip 200*td*, an SPD chip 190 and an RCD 410.

The first data chips 201*a*~201*h*, the first parity chip 200*ta*, and the first CRC chip 200*tb* constituting a first channel CH_1 are connected to the RCD 410 through a first transmission line TL11, the second data chips 202*a*~202*h* and the second parity chip 200*tc* constituting a second channel CH_2 are connected to the RCD 410 through a second transmission line TL12, and the third ECC chip 200*td* is connected to the RCD 410 through a third transmission line TL13.

The SPD chip 190 provides the memory controller 50 with the hard fail information HFI1 and HFI2. The RCD 410 selectively incorporates the third ECC chip 200*td* in one of the first channel CH_1 and the second channel CH_2 based on the device information DI stored in the SPD chip 190, which indicates whether each of the first channel CH_1 and the second channel CH_2 includes a memory chip in which uncorrectable hard fail occurs, and controls the first channel CH_1 and the second channel CH_2 such that the first channel CH_1 and the second channel CH_2 operate independently from each other.

Figure 19:
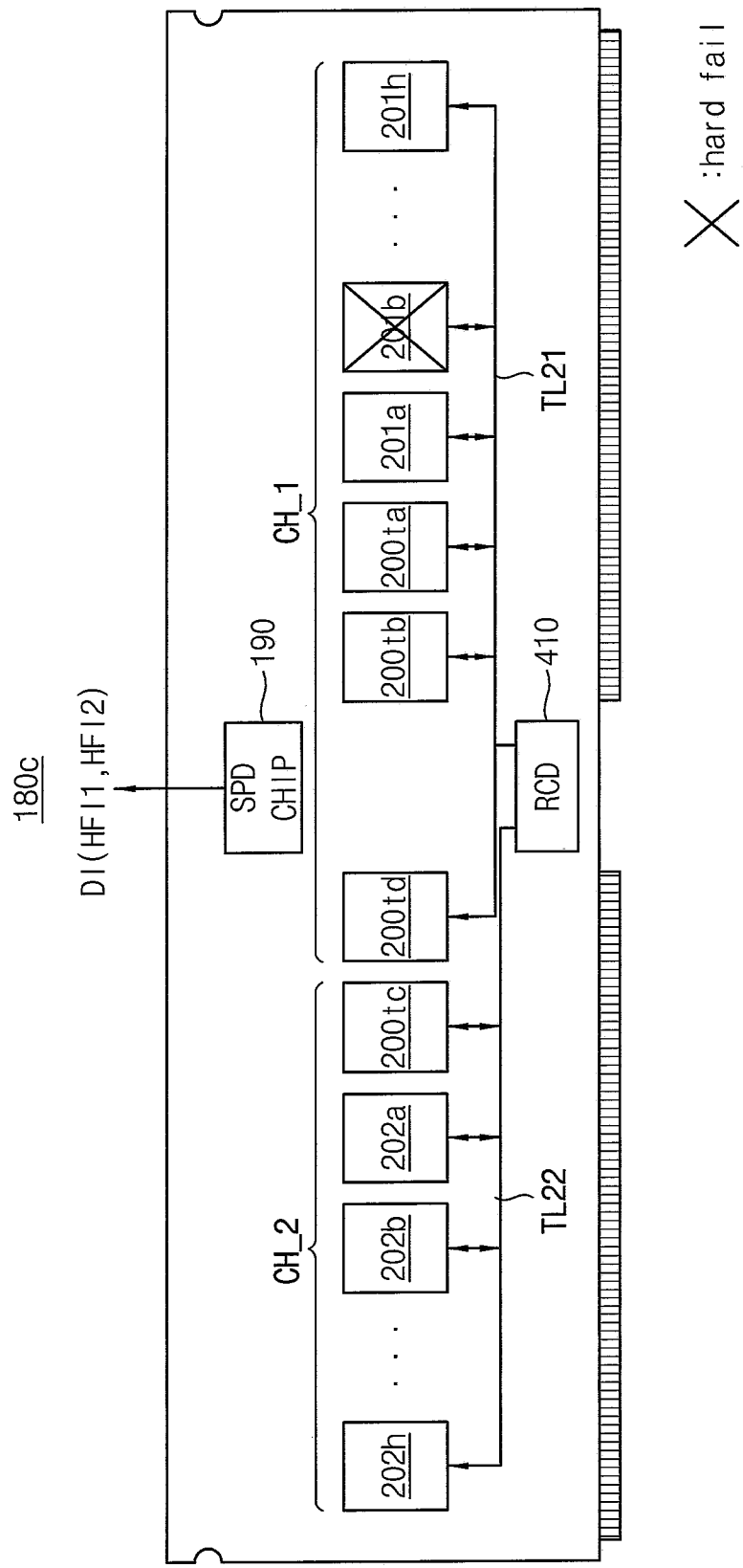
FIG. 19 illustrates an example of the memory module in the memory system of FIG. 1 according to exemplary embodiments.

FIG. 19 illustrates an example of the memory module in the memory system of FIG. 1 according to exemplary embodiments.

Referring to FIG. 19, a memory module 180*c* may include a plurality of first data chips 201*a*~201*h*, a first ECC chip including a first parity chip 200*ta*, a first CRC chip 200*tb*, a plurality of second data chips 202*a*~202*h*, a second ECC chip including a second parity chip 200*tc*, a third ECC chip 200*td*, an SPD chip 190 and an RCD 410.

The first data chips 201*a*~201*h*, the first parity chip 200*ta*, and the first CRC chip 200*tb* constituting a first channel CH_1 are connected to the RCD 410 through a first transmission line TL21, the second data chips 202*a*~202*h* and the second parity chip 200*tc* constituting a second channel CH_2 are connected to the RCD 410 through a second transmission line TL22, and the third ECC chip 200*td* is connected to the RCD 410 through the first transmission line TL21.

The SPD chip 190 provides the memory controller 50 with the hard fail information HFI1 and HFI2. Since the uncorrectable hard fail occur in the data chip 201*b* in the first channel CH_1, the RCD 410 incorporates the third ECC chip 200*td* in the first channel CH_1 under control of the memory controller 50 and controls the first channel CH_1 and the second channel CH_2 such that the first channel CH_1 and the second channel CH_2 operate independently from each other.

Figure 20:
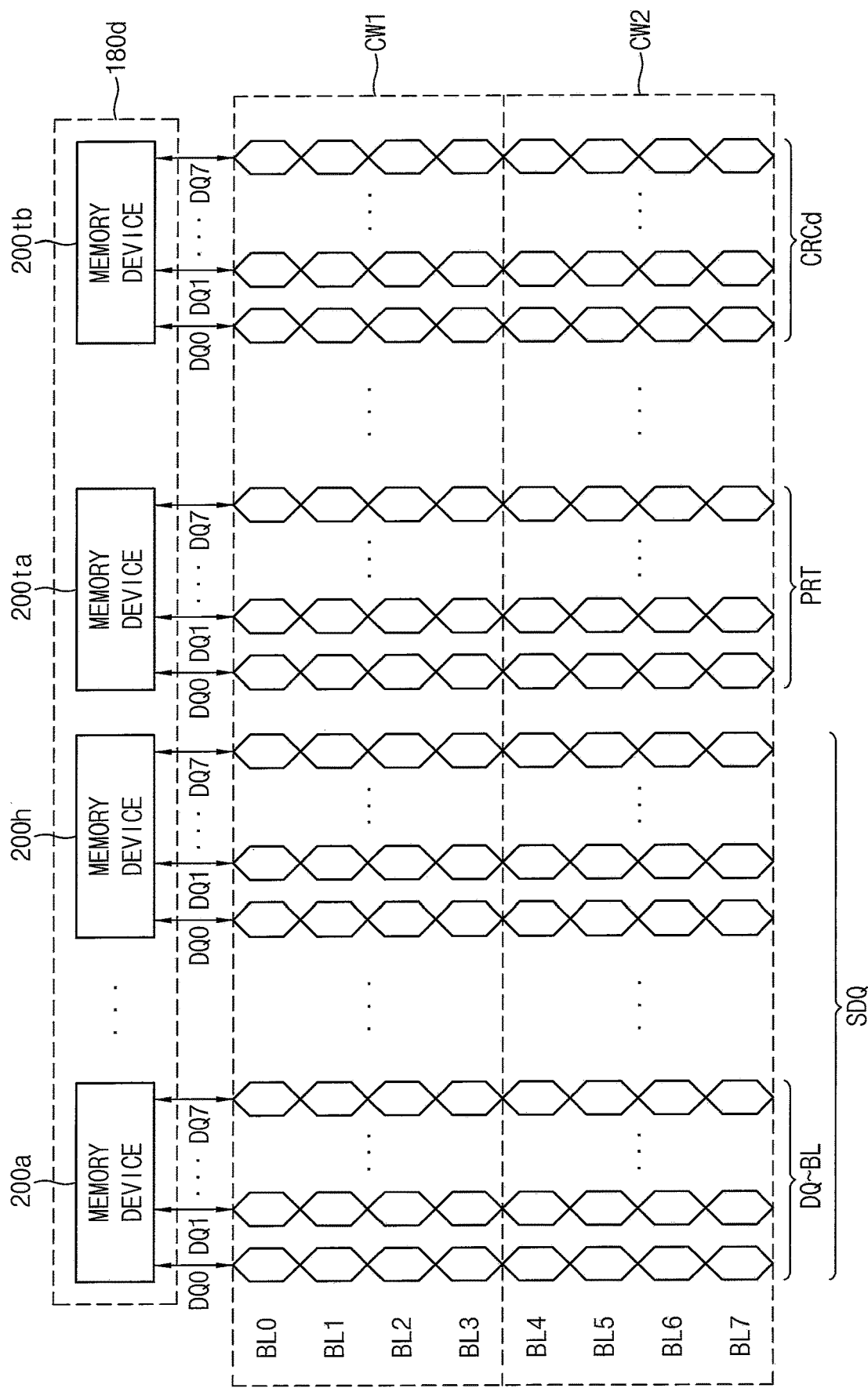
FIG. 20 is a diagram illustrating a burst operation of the memory system of FIG. 1 according to exemplary embodiments.

FIG. 20 is a diagram illustrating a burst operation of the memory system of FIG. 1 according to exemplary embodiments.

Referring to FIG. 20, a memory module 180*d* may include one memory rank, and one memory rank may include a plurality of ×8 memory chips 200*a*~200*h*, 200*ta* and 200*tb*.

The memory module 180*d* may include the memory chip 200*ta* that stores a parity data and the memory chip 200*tb* that stores CRC data. For example, when the memory module 180*d* is a ×8 DIIMM having a total bus width of 80 bits, the total number of memory chips of the memory module 180*a* is 10. For example, the memory module 180*d* may include 8 ×8 data chips 200*a*~200*h*, a first parity chip 200*ta* and a first CRC chip 200*tb*.

The data bus width of each of ×8 memory chips 200*a*~200*h*, 200*ta* and 200*tb* is 8 bits. When each of the memory chips 200*a*~200*h*, 200*ta* and 200*tb* outputs data, 8-bit data may be output simultaneously through eight DQ (data input/output) pads DQ0~DQ7. The 8-bit data may be simultaneously output from each of the memory chips 200a~200h, 200ta and 200tb.

The DQ pads DQ0~DQ7 of each of the memory chips 200a~200h, 200ta and 200tb may input and output eight pieces of data BL0~BL7 as a basic unit of a burst operation. For example, in the case of an ×8 DIMM, data input and output per unit task during a burst operation may be 640 bits corresponding to a value of 8 (BL)×8 (data bus width)×10 (number of chips).

The data of 640 bits may fill one cache line of the memory controller 50. A unit by which error correction is performed may be defined as one codeword. For example, in the error correction mode of ×8 DIMM, each error correction may be performed on half cache line. Therefore, the basic unit of a burst operation for filling one cache line may include two codewords. The ECC engine 100 of the memory controller 50 may implement an error correction algorithm with respect to 320-bit data of each of a first codeword CW1 and a second codeword CW2.

Figure 21:
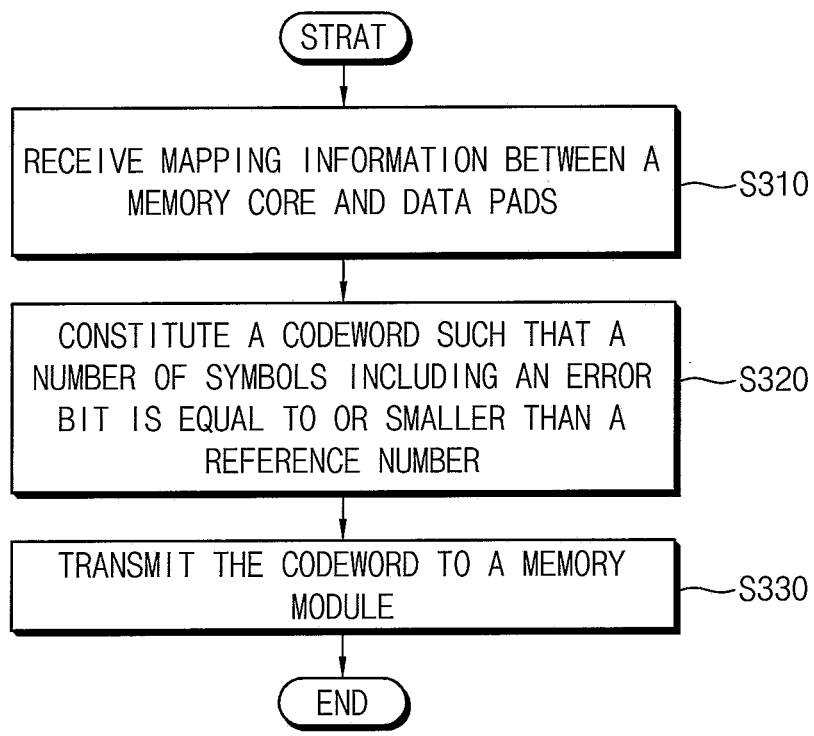
FIG. 21 is a flow chart illustrating an operation of a memory controller according to exemplary embodiments.

FIG. 21 is a flow chart illustrating an operation of a memory controller according to exemplary embodiments.

Referring to FIGS. 1 through 7, and 10 through 21, there is provided a method of operating a memory controller 50 that controls a memory module 180 on which a plurality of memory chips are mounted. According to the method, the memory controller 50 receives mapping information MPIN indicating a corresponding relationship between a portion of a user data set and input/output pads in each of the plurality of memory chips from the memory module 180 (S310). The memory controller 50 further receives error tendency information ETIN. The portion of a user data set may correspond to an amount of data inputted or outputted from each of the plurality of memory chips in a burst operation.

An ECC engine 100 of the memory controller 50 constitutes a codeword based on the mapping information MPIN or the mapping information MPIN and error tendency information ETIN such that a number of symbols including an error bit in a user data set stored in the memory chips, is equal to or smaller than a reference number (S320). The ECC engine 100 transmits the codeword to the memory module 180 (S330).

Figure 22:
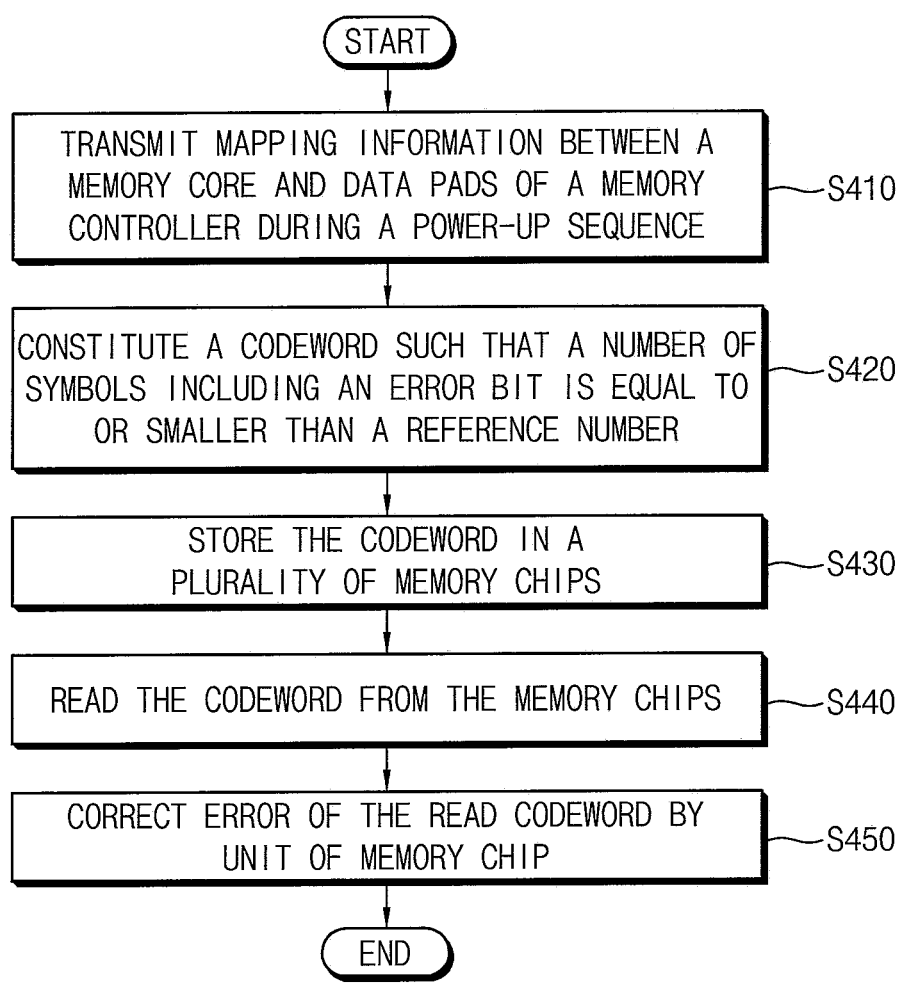
FIG. 22 is a flow chart illustrating an operation of a memory system according to exemplary embodiments.

FIG. 22 is a flow chart illustrating an operation of a memory system according to exemplary embodiments.

Referring to FIGS. 1 through 20 and 22, there is provided a method of operating a memory system 20 which includes a memory module 180 on which a plurality of memory chips are mounted and a memory controller 50 to control the memory module 180.

According to the method, the memory module 180 transmits, to the memory controller 50, mapping information MPIN or the mapping information MPIN and error tendency information ETIN during a power-up sequence of the memory module 180 (S410). The error tendency information ETIN indicates error tendency or error pattern which repeatedly occur in each of a plurality of memory chips.

An ECC engine 100 of the memory controller 50 constitutes a codeword based on the mapping information MPIN or the mapping information MPIN and the error tendency information ETIN such that a number of symbols including an error bit in a user data set stored in the memory chips, is equal to or smaller than a reference number (S420).

The ECC engine 100 transmits the codeword to the memory module 180 and the memory chips store the codeword (S430).

The memory controller 50 reads the codeword from the memory chips (S440). The ECC engine 100 corrects errors of the read codeword by unit of memory chip (S450).

Figure 23:
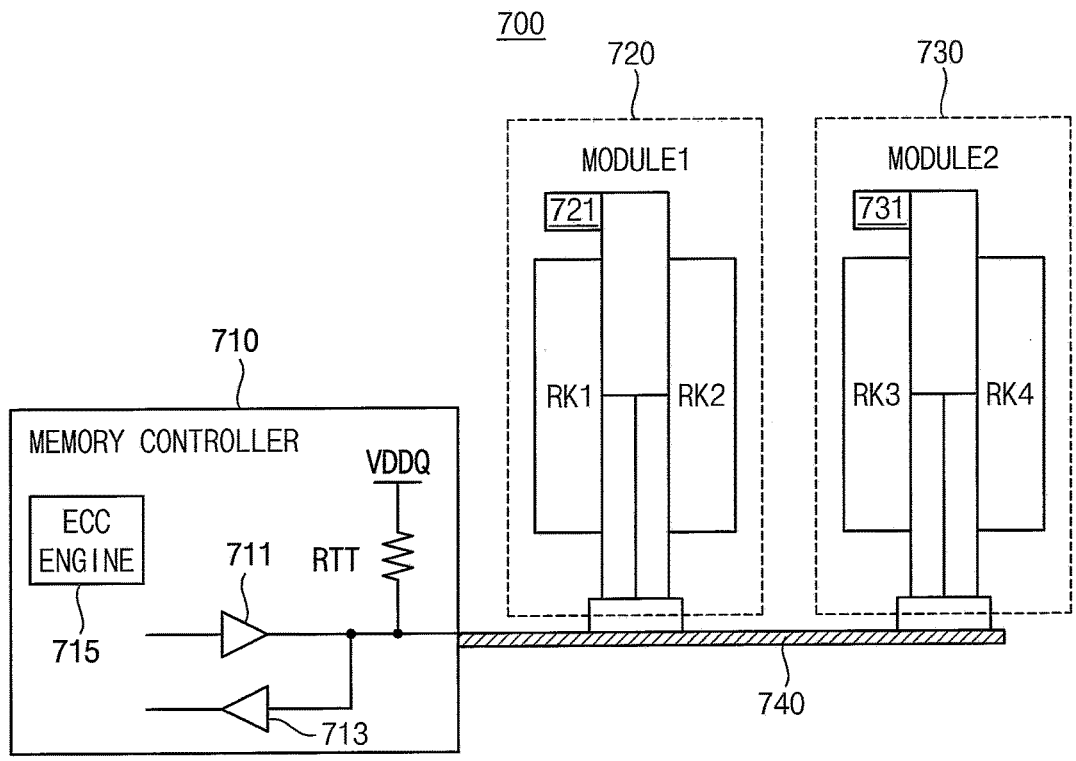
FIG. 23 is a block diagram illustrating a memory system having quad-rank memory modules according to exemplary embodiments.

FIG. 23 is a block diagram illustrating a memory system having a quad-rank memory module according to exemplary embodiments.

Referring to FIG. 23 a memory system 700 may include a memory controller 710 and two dual rank memory modules 720 and 730.

The memory controller 710 may control a memory module 720 and/or 730 so as to perform a command supplied from a processor or host. The memory controller 710 may be implemented in a processor or host, or may be implemented with an application processor or a system-on-a-chip (SoC).

For signal integrity, a source termination may be implemented with a resistor RTT on a bus 740 of the memory controller 710. The resistor RTT may be coupled to a power supply voltage VDDQ. The memory controller 710 may include a transmitter 711 for transmitting a signal to the at least one or more memory modules 720 and 730, and a receiver 713 for receiving a signal from the at least one or more memory modules 720 and 730. The memory controller 710 may include an ECC engine 715, and the ECC engine 715 may employ the ECC engine 100 of FIG. 5

Therefore, the ECC engine 715 may constitute a codeword based on mapping information such that a number of symbols including an error bit in a user data set stored in the memory chips, is equal to or smaller than a reference number. Therefore, the ECC engine 715 may increase error correction capability.

The two dual rank memory modules 720 and 730 may be referred to as a first memory module 720 and a second memory module 730. The first memory module 720 and the second memory module 730 may be coupled to the memory controller 710 through the bus 740. Each of the first memory module 720 and the second memory modules 730 may correspond to the memory module 180a of FIG. 14. The first memory module 720 may include two memory ranks RK1 and RK2 and an SPD chip 721, and the second memory module 730 may include two memory ranks RK3 and RK4 and an SPD chip 731.

The SPD chip 721 stores mapping information and error tendency information associated with the memory chips mounted on the first memory module 720, and the SPD chip 731 stores mapping information and error tendency information associated with the memory chips mounted on the second memory module 730. The ECC engine 715 may individually constitute codewords based on the information stored in the SPD chip 721 and the SPD chip 731 and may transmit corresponding codewords to the first memory module 720 and the second memory module 730.

Each of the first memory module 720 and the second memory module 730 may include a plurality of data chips, a first ECC chip and a second ECC chip.

Figure 24:
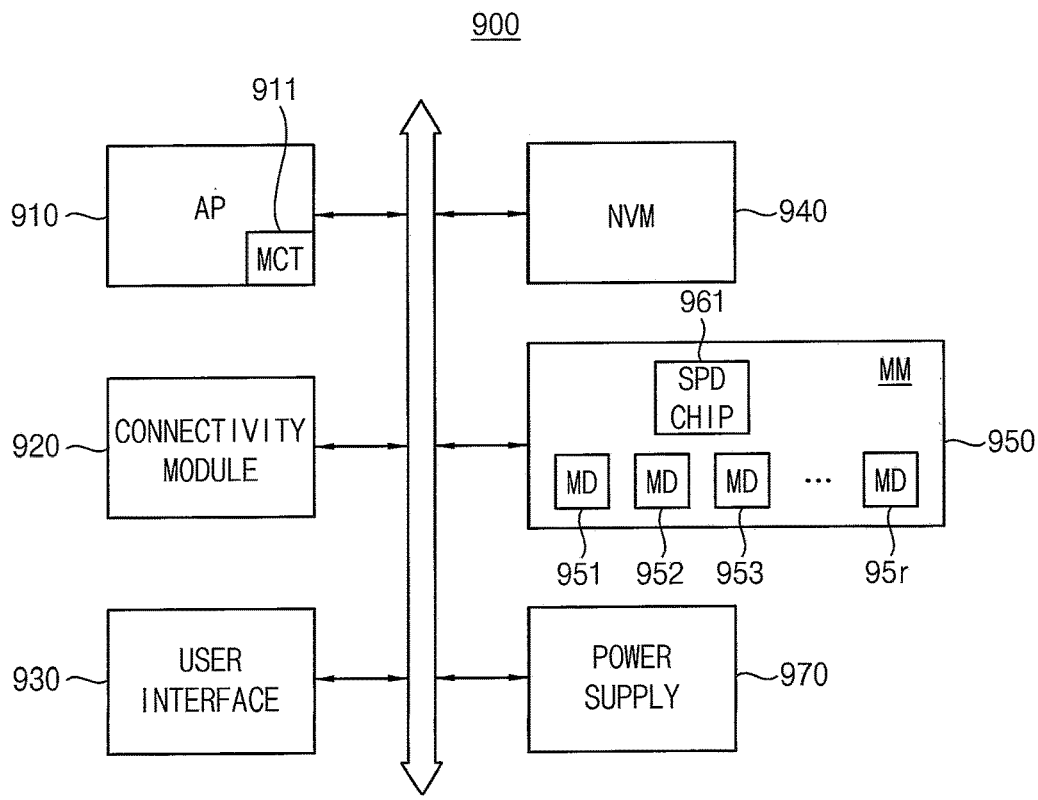
FIG. 24 is a block diagram illustrating a mobile system including a memory module according to exemplary embodiments.

FIG. 24 is a block diagram illustrating a mobile system including a memory module according to exemplary embodiments.

Referring to FIG. 24, a mobile system 900 may include an application processor 910, a connectivity module 920, a memory module 950, a nonvolatile memory device 940, a user interface 930, and a power supply 970. The application processor 910 may include a memory controller (MCT) 911, and the memory controller 911 may employ an ECC engine such as the ECC engine 100 of FIG. 5.

The application processor 910 may execute applications, such as a web browser, a game application, a video player, etc. The connectivity module 920 may perform wired or wireless communication with an external device.

The memory module (MM) 950 may store data processed by the application processor 910 or operate as a working memory. The memory module 950 may include a plurality of semiconductor memory devices (MD) 951 to 95*r* (where r is a positive integer greater than three), and an SPD chip 961. The SPD chip 961 may include mapping information and error tendency information associated with the semiconductor memory devices 951 to 95*r*.

The semiconductor memory devices 951 to 95*r* may include a plurality of data chips, at least one first ECC chip and at least one second ECC chip. Therefore, the memory controller 911 may constitute a codeword based on the mapping information or mapping information and error tendency information such that a number of symbols including an error bit in a user data set stored in the memory chips, is equal to or smaller than a reference number. Therefore, the memory controller 911 may increase error correction capability.

The nonvolatile memory device 940 may store a boot image for booting the mobile system 900. The user interface 930 may include at least one input device, such as a keypad, a touch screen, etc., and at least one output device, such as a speaker, a display device, etc. The power supply 970 may supply an operating voltage to the mobile system 900.

The mobile system 900 or components of the mobile system 900 may be mounted using various types of packages.

Exemplary embodiments may be applied to various systems including a memory module and a memory controller that includes an ECC engine.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A memory controller configured to control a memory module including a plurality of memory devices which constitute a first channel and a second channel, the memory controller comprising:
   an error correction code (ECC) engine; and
   a control circuit configured to control the ECC engine,
   wherein the ECC engine is configured to:
   generate a codeword including a plurality of symbols by adaptively constructing, based on device information including mapping information, each of the plurality of symbols from a predetermined number of data bits received via a plurality of input/output pads of each of the plurality of memory devices, and
   transmit the codeword to the memory module,
   wherein the mapping information indicates whether each of the plurality of input/output pads is mapped to the same symbol among the plurality of symbols or different symbols among the plurality of symbols, and
   wherein each of the plurality of symbols corresponds to a unit of error correction of the ECC engine.

2. The memory controller of claim 1, further comprising:
   a control circuit configured to generate a configuration control signal from the mapping information,
   wherein the predetermined number of data bits received via the plurality of input/output pads of each of the plurality of memory devices is determined by a burst length of a burst operation,
   wherein the plurality of memory devices are configured to receive a user data set of a plurality of data bits in the burst operation, and
   wherein the ECC engine includes:
   an ECC encoder configured to perform an ECC encoding operation on the user data set to generate a first message including a first codeword and a second codeword, in response to the configuration control signal;
   an ECC decoder configured to perform an ECC decoding operation on a second message including a first stored codeword and a second stored codeword to detect and correct errors in the second message, the second message transmitted from the memory module; and
   a memory configured to store a plurality of ECCs, the memory configured to provide the ECC encoder and the ECC decoder with a selected ECC of the plurality of ECCs in response to the configuration control signal.

3. The memory controller of claim 2,
   wherein the ECC decoder includes:
   a cyclic redundancy check (CRC) generator configured to generate a CRC data based on the user data set;
   a parity generator configured to perform the ECC encoding operation on the user data set and the CRC data to generate a parity data based on the selected ECC; and
   a data reordering logic configured to rearrange, in response to the configuration control signal, the user data set, the CRC data and the parity data such that a number of symbols including an error bit is reduced.

4. The memory controller of claim 3,
   wherein the device information further includes first hard fail information associated with a first portion of the plurality of memory devices in the first channel and second hard fail information associated with a second portion of the plurality of memory devices in the second channel,
   wherein the first hard fail information indicates a hard fail if the number of symbols including an error bit, in the first portion of the plurality of memory devices, is greater than a reference number and otherwise, indicates a soft fail, and the second hard fail information indicates a hard fail if the number of symbols including an error bit, in the second portion of the plurality of memory devices, is greater than the reference number and otherwise, indicates a soft fail, and
   wherein the parity generator, in response to the first hard fail information indicating a soft fail, generates a first parity data based on a first ECC of the plurality of ECCs, and, in response to the first hard fail information indicating a hard fail, generates a second parity data based on a second ECC of the plurality of ECCs.

5. The memory controller of claim 4,
   wherein a number of bits in the second parity data is greater than a number of bits in the first parity data.

6. The memory controller of claim 2,
   wherein the ECC decoder includes:
   a data separation logic circuit configured to separate the second message into the user data set, a cyclic redundancy check (CRC) data and a parity data;
   a first comparator configured to compare the CRC data and a reference CRC data to generate a first syndrome data, the reference CRC data being generated based on the user data set;
   a detector configured to generate a detection signal indicating whether the user data set includes at least one error bit based on the first syndrome data;
   a second comparator configured to compare the parity data and check bits to generate a second syndrome data, the check bits being generated based on the user data set; and a data corrector configured to correct the at least one error bit in the user data set based on the second syndrome data and the detection signal.

7. The memory controller of claim 6,
wherein the data corrector is configured to correct symbols including the error bit in the user data set by unit of memory device.

8. The memory controller of claim 1,
wherein the device information further includes a hard fail information associated with memory devices,
wherein the ECC engine, in response to the hard fail information indicating that a number of symbols including at least one error bit is greater than a reference number in at least one of the plurality of memory devices, increases a number of error detection/correction bits in the codeword.

9. A memory system comprising:
a first memory module including a plurality of memory devices which constitute a first channel and a second channel, and a serial presence detect (SPD) device that stores first mapping information as a device information; and
a memory controller configured to control the first memory module,
wherein the memory controller includes:
an error correction code (ECC) engine; and
a control circuit configured to control the ECC engine,
wherein the ECC engine is configured to:
generate a codeword including a plurality of symbols by adaptively constructing, based on the first mapping information, each of the plurality of symbols from a predetermined number of data bits received via a plurality of input/output pads of each of the plurality of memory devices, and
transmit the codeword to the first memory module,
wherein the first mapping information indicates whether each of the plurality of input/output pads is mapped to the same symbol among the plurality of symbols or different symbols among the plurality of symbols, and
wherein each of the plurality of symbols corresponds to a unit of error correction of the ECC engine.

10. The memory system of claim 9,
wherein the control circuit is configured to generate a configuration control signal from the first mapping information,
wherein the predetermined number of data bits received via the plurality of input/output pads of each of the plurality of memory devices is determined by a burst length of a burst operation,
wherein the plurality of memory devices are configured to receive a user data set of a plurality of data bits in the burst operation, and
wherein the ECC engine includes:
an ECC encoder configured to perform an ECC encoding operation on the user data set to generate a first message including a first codeword and a second codeword, in response to the configuration control signal;
an ECC decoder configured to perform an ECC decoding operation on a second message including a first codeword and a second codeword to detect and correct errors in the second codeword, the second message transmitted from the first memory module; and
a memory configured to store a plurality of ECCs, the memory configured to provide, in response to the configuration control signal, the ECC encoder and the ECC decoder with a selected ECC of the plurality of ECCs.

11. The memory system of claim 10,
wherein the ECC decoder includes:
a cyclic redundancy check (CRC) generator configured to generate a CRC data based on the user data set;
a parity generator configured to perform an ECC encoding operation on the user data set and the CRC data to generate a parity data based on the selected ECC; and
a reordering logic circuit configured to rearrange, in response to the configuration control signal, the user data set, the CRC data and the parity data such that a number of symbols including an error bit is reduced.

12. The memory system of claim 9, wherein:
the first channel includes first through eighth data devices and first and second ECC devices,
the second channel includes ninth through sixteenth data devices and second and third ECC devices,
the first channel and the second channel operate independently from each other, and each of the plurality of memory devices is configured to be 4 bits wide.

13. The memory system of claim 12,
wherein the ECC engine is configured to receive the first mapping information from the first memory module during a power-up sequence, and
wherein each of the plurality of memory devices is a dynamic random access memory (DRAM).

14. The memory system of claim 9, further comprising:
a second memory module electrically connected to the memory controller,
wherein the second memory module includes a plurality of second memory devices and a second SPD device that stores second mapping information, and
wherein the ECC engine is configured to independently generate at least one codeword to be transmitted to the first memory module and the second memory module, based on information stored in the SPD device and information stored in the second SPD device.

15. A memory system comprising:
a memory module including a plurality of memory devices which constitute a first channel and a second channel, and a serial presence detect (SPD) device that stores a first hard fail information and a second hard fail of the first channel and the second channel, respectively, as a device information; and
a memory controller configured to control the memory module,
wherein the memory controller includes:
an error correction code (ECC) engine configured to generate a codeword including a plurality of symbols from a plurality of data bits that are to be stored in the plurality of memory devices; and
a control circuit configured to control the ECC engine,
wherein the first hard fail information indicates a hard fail in the first channel if a number of symbols including an error bit among the plurality of symbols is greater than a reference number and otherwise, indicates a soft fail,
wherein the second hard fail information indicates a hard fail in the second channel if a number of symbols including an error bit among the plurality of symbols is greater than the reference number and otherwise, indicates a soft fail,
wherein each of the plurality of symbols includes a predetermined number of data bits received via a plurality of input/output pads of each of the plurality of memory devices,
wherein the ECC engine, in response to at least one of the first hard fail information and the second hard fail information, increases a number of error detection/correction bits in the codeword, and wherein the at least one of the first hard fail information and the second hard fail information indicates that the number of symbols including the error bit is greater than the reference number in at least one of the plurality of memory devices in a corresponding channel of the first channel and the second channel.

16. The memory system of claim 15, wherein:

the plurality of memory devices include first through eighth data devices, a first ECC device, ninth through sixteenth data devices, and a second ECC device, the first channel includes the first through eighth data devices and the first ECC device, the second channel includes the ninth through sixteenth data devices and the second ECC device, and the first channel and the second channel operate independently from each other.

17. The memory system of claim 16, wherein;

the memory module further includes a registered clock driver (RCD) configured to buffer and deliver a command and an address received from the memory controller to the plurality of memory devices, the RCD is connected to the SPD device, the first channel and the second channel are separately connected to the RCD, the first ECC device includes a first cyclic redundancy check (CRC) device and a first parity device, the second ECC device includes a second parity device, and the memory module further include a third ECC device connected to the RCD.

18. The memory system of claim 17, wherein the RCD is configured to selectively incorporate the third ECC device in one of the first channel and the second channel based on the first hard fail information and the second hard fail information.

19. The memory system of claim 16, wherein;

the memory module further includes a registered clock driver (RCD) configured to buffer and deliver a command and an address received from the memory controller to the plurality of memory devices, the RCD is connected to the SPD device, the first channel and the second channel are separately connected to the RCD, the first ECC device includes a first cyclic redundancy check (CRC) device, a first parity device and a third parity device, and the second ECC device includes a second parity device.

20. The memory system of claim 15, wherein the ECC engine is configured to receive the first hard fail information and the second hard fail information from the memory module during a power-up sequence, wherein each of the plurality of memory devices is 4 bits wide, and wherein each of the plurality of memory devices is a dynamic random access memory (DRAM).

* * * * *